(12) United States Patent
Zimmermann et al.

(10) Patent No.: US 11,695,131 B2
(45) Date of Patent: Jul. 4, 2023

(54) FUEL CELL AND FUEL CELL SYSTEM FOR AN AIRCRAFT

(71) Applicant: Airbus Defence and Space GmbH, Taufkirchen (DE)

(72) Inventors: Kristian Zimmermann, Taufkirchen (DE); Frank Hermle, Taufkirchen (DE); Stephan Friedl, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 14 days.

(21) Appl. No.: 17/388,177

(22) Filed: Jul. 29, 2021

(65) Prior Publication Data
US 2022/0037685 A1    Feb. 3, 2022

(30) Foreign Application Priority Data
Jul. 29, 2020   (DE) .................... 10 2020 120 033.1

(51) Int. Cl.
*H01M 8/04089*    (2016.01)
*H01M 8/0247*    (2016.01)
(Continued)

(52) U.S. Cl.
CPC ..... *H01M 8/04089* (2013.01); *H01M 8/0247* (2013.01); *H01M 8/0265* (2013.01); *B64D 2041/005* (2013.01); *H01M 8/004* (2013.01); *H01M 8/025* (2013.01); *H01M 8/0252* (2013.01); *H01M 8/243* (2013.01);
(Continued)

(58) Field of Classification Search
CPC ........... H01M 8/04089; H01M 8/0247; H01M 8/0265; H01M 8/124; H01M 8/243; H01M 8/004; H01M 8/2465; H01M 8/2475; H01M 8/026; H01M 8/0263; H01M 8/2425; H01M 8/2428; H01M 8/2432; H01M 8/2483;
(Continued)

(56) References Cited

U.S. PATENT DOCUMENTS

2004/0151975 A1   8/2004 Allen
2006/0234109 A1*  10/2006 Datta .................... B29C 70/882
                                                  429/514
(Continued)

FOREIGN PATENT DOCUMENTS

CN    111 224 143 A      6/2020
CN    111224143    *     6/2020
(Continued)

OTHER PUBLICATIONS

German Search Report for Application No. 102020124145.3 dated May 4, 2021.
(Continued)

*Primary Examiner* — Matthew W Van Oudenaren
(74) *Attorney, Agent, or Firm* — Jenkins, Wilson, Taylor & Hunt, P.A.

(57) ABSTRACT

A fuel cell to provide a higher power density. The fuel cell can be produced by 3D printing in ceramic and has an improved power density by virtue of its spiral shape. In order to better extract the energy generated by the fuel cell, an interconnector sheet can be fastened positively to fastening knobs of the fuel cell by holding eyes. In addition, the interconnector sheet can be fixed by glass solder.

13 Claims, 24 Drawing Sheets

(51) Int. Cl.
  *H01M 8/0265* (2016.01)
  *B64D 41/00* (2006.01)
  *H01M 8/00* (2016.01)
  *H01M 8/025* (2016.01)
  *H01M 8/2475* (2016.01)
  *H01M 8/2428* (2016.01)
  *H01M 8/2483* (2016.01)
  *H01M 8/2484* (2016.01)
  *H01M 8/243* (2016.01)
  *H01M 8/0252* (2016.01)

(52) U.S. Cl.
  CPC ........ *H01M 8/2428* (2016.02); *H01M 8/2475* (2013.01); *H01M 8/2483* (2016.02); *H01M 8/2484* (2016.02); *H01M 2250/20* (2013.01)

(58) Field of Classification Search
  CPC ........... H01M 8/2484; H01M 2250/20; H01M 2008/1293; B64D 2041/005
  See application file for complete search history.

(56) References Cited

U.S. PATENT DOCUMENTS

| | | | |
|---|---|---|---|
| 2007/0224489 A1* | 9/2007 | Imura | H01M 8/023 429/510 |
| 2008/0070082 A1 | 3/2008 | Norimatsu et al. | |
| 2014/0325991 A1* | 11/2014 | Liew | F02C 9/18 60/785 |
| 2018/0351191 A1 | 12/2018 | Kang et al. | |
| 2022/0037678 A1 | 2/2022 | Zimmerman et al. | |

FOREIGN PATENT DOCUMENTS

| | | |
|---|---|---|
| DE | 11 2006 000 121 B4 | 2/2013 |
| EP | 2 654 115 A1 | 10/2013 |
| EP | 3 754 768 A1 | 12/2020 |
| JP | 2002 151106 A | 5/2002 |
| JP | 2006 100091 A | 4/2006 |
| JP | 2008 159344 A | 7/2008 |
| JP | 2008159344 * | 7/2008 |
| WO | WO 98/35398 A1 | 8/1998 |
| WO | WO 2004/059771 A2 | 7/2004 |
| WO | WO 2019/074538 A1 | 4/2019 |

OTHER PUBLICATIONS

German Search Report for Application No. 102020124145.3 dated Jun. 17, 2021.
European Search Report for Application No. 21182358 dated Dec. 9, 2021.
European Search Report for Application No. 21182359 dated Dec. 10, 2021.
European Search Report for Application No. 21182360 dated Dec. 13, 2021.
German Search Report for Application No. 102020120033.1 dated May 4, 2021.
German Search Report for Application No. 102020120035.8 dated May 10, 2021.

* cited by examiner

FUEL CELL AND FUEL CELL SYSTEM FOR AN AIRCRAFT

CROSS-REFERENCE TO RELATED APPLICATION

This application claims priority to German Patent Application DE 10 2020 120 033.1 filed Jul. 29, 2020, the entire disclosure of which is incorporated by reference herein.

TECHNICAL FIELD

The disclosure herein relates to a fuel cell. The disclosure herein furthermore relates to a fuel cell system for an aircraft and to an aircraft.

BACKGROUND

Alternative propulsion concepts and energy sources are becoming increasingly important not only in individual transport but also in aviation. One concept is electric drives or, more generally, the generation of electrical energy in an aircraft. From the point of view of aviation, high power density, easy maintainability and high scalability are important. Fuel cells, in particular solid oxide fuel cells, are one candidate for providing the necessary energy.

SUMMARY

It is an object of the disclosure herein to improve fuel cells for use in aviation. The object is achieved by the subject matter disclosed herein.

The disclosure herein provides a fuel cell, preferably a solid oxide fuel cell, for a fuel cell system, preferably of an aircraft, wherein the fuel cell has a plurality of fuel cell regions arranged along a construction axis, wherein each fuel cell region has a gas channel, which is designed to extend in the circumferential direction around the construction axis.

It is preferred that a first fuel cell region having a first gas channel for fuel and a second fuel cell region having a second gas channel for oxidizer are arranged.

It is preferred that the fuel cell regions are formed integrally as a single one-piece element.

It is preferred that the fuel cell regions have a substantially hexagonal shape in plan view.

It is preferred that a plurality of first and second fuel cell regions is arranged alternately along the construction axis in such a way that the first gas channels and second gas channels are fluidically connected.

It is preferred that each gas channel has at least one gas inlet region and at least one gas outlet region, which are each arranged in such a way that, when a further fuel cell region is arranged/formed offset along the construction axis, the gas outlet region is aligned with and/or fluidically connected to the gas inlet region of the further fuel cell region.

It is preferred that the gas inlet region and/or the gas outlet region are/is arranged at opposite ends of the gas channel.

It is preferred that an ion-conductive separating layer is arranged on one of the gas channels or between the gas channels in order to connect the gas channels to one another in an ion-conducting manner.

It is preferred for the fuel cell to comprise at least one distribution tube, which is designed to feed fuel and/or oxidizer into the respective gas channel or to discharge reaction product or unconsumed gas from the respective gas channel, wherein, when viewed along the construction axis, the distribution tube is at least partially surrounded by each gas channel.

It is preferred that the fuel cell comprises a plurality of subsections, wherein the gas channels in the respective subsections can be supplied in parallel with fuel and oxidizer.

It is preferred that the gas channels, when viewed in the direction of extent thereof, enclose an angle, preferably an angle between 30° and 60°, with a plane orthogonal to the construction axis.

It is preferred that the gas channels form a double helix.

It is preferred that each gas channel has a gas channel curvature region and an adjoining gas channel plane region.

It is preferred that the gas channel curvature region is curved by 120° or 180°.

It is preferred that a gas inlet region and/or a gas outlet region are/is arranged at the gas channel plane region, preferably in the middle of the gas channel plane region.

It is preferred that each gas channel has a gas supply region which is connected to the respective distribution tube.

It is preferred that each distribution tube is arranged within a region surrounded by the gas channel curvature regions and the gas channel plane regions.

It is preferred that the fuel cell has a plurality of interconnector sheets designed to extract the electrical energy.

It is preferred that each gas channel contains a conductive electrode coating for the generated electrical energy.

It is preferred that each interconnector sheet has at least one contact tongue, which projects into the corresponding first gas channel or second gas channel.

It is preferred that the gas channel comprises at least one aperture for the contact tongue.

It is preferred that a plurality of contact tongues is arranged in a comb-like manner.

It is preferred that each interconnector sheet comprises only a single contact tongue.

It is preferred that each interconnector sheet has an electrical connection region which adjoins the contact tongue.

It is preferred that the connection region is designed in such a way that it faces radially outward in the installed state of the interconnector sheet, thus enabling it to be engaged by a conductive element.

It is preferred that each interconnector sheet has a clamping region which extends substantially parallel to and at a distance from the contact tongue in order to hold the interconnector sheet on the fuel cell.

It is preferred that the interconnector sheet is embedded in the electrode coating.

It is preferred that the interconnector sheet has a coefficient of expansion similar to the gas channel into which it projects in order to prevent delamination of the interconnector sheet.

It is preferred that the interconnector sheet comprises a connection region for tapping off the electrical energy, wherein the connection region is designed in such a way that interconnector sheets stacked along the construction direction can be connected by a rod, preferably a threaded rod.

It is preferred that the interconnector sheet has at least one holding eye, by which the interconnector sheet can be held in a positive manner on the fuel cell, preferably by being suspended on a knob.

It is preferred that the holding eye has a circular shape or D shape.

It is preferred that each gas channel has a rectangular cross section.

It is preferred that each fuel cell region has a holding device for holding an interconnector sheet.

It is preferred that the holding device has at least one fastening knob for the positive fastening of the interconnector sheet.

It is preferred that fastening knobs are arranged on each fuel cell region.

It is preferred that the fastening knob is of hemispherical, quarter-spherical or hook-like design.

It is preferred that the interconnector sheet comprises a band-like region which, in the fastened state, conforms to the fuel cell region.

It is preferred that the fuel cell has a winding structure for a conductive element, for example a wire, on its outer circumferential surface.

It is preferred that the winding structure is of spiral design. The winding structure preferably comprises a groove. The groove preferably extends in such a way that interconnector sheets of the same polarity can be electrically connected to one another by winding a conductive element around the winding structure.

The disclosure herein provides a fuel cell system for an aircraft, comprising a plurality of preferred fuel cells, which are arranged in one plane and/or in a manner stacked at a distance from one another along their construction axis.

The fuel cell system preferably comprises a fuel tank and/or a heating device, wherein the fuel cells are connected in a fluid-conducting manner to the fuel tank and in a heat-conducting manner to the heating device.

The fuel cell system preferably comprises an electrical energy storage device, which is designed for the intermediate storage of electrical energy generated by the fuel cell, and/or an oxidizer tank, which is connected to the fuel cell in a fluid-conducting manner.

The disclosure herein furthermore provides an aircraft comprising a preferred fuel cell and/or a preferred fuel cell system.

The disclosure herein provides an interconnector sheet for a fuel cell, wherein the interconnector sheet has at least one contact tongue, which can be introduced into a gas channel, a connection region, which is designed for tapping off the electrical energy, and at least one holding eye, by which the interconnector sheet can be held in a positive manner on the fuel cell by being suspended on a knob, and/or has at least one clamping region, by which the interconnector sheet can be held in an aperture in the fuel cell by being inserted.

It is preferred that the interconnector sheet is designed as a bent sheet-metal part.

It is preferred that a plurality of contact tongues is arranged in a comb-like manner.

It is preferred that the interconnector sheet has a coefficient of expansion similar to the gas channel into which it can be inserted in order to prevent delamination of the interconnector sheet.

It is preferred that the connection region is designed in such a way that interconnector sheets arranged along a construction direction can be connected by a rod, preferably a threaded rod.

It is preferred that the holding eye has a circular shape or D shape.

It is preferred that the interconnector sheet comprises a band-like region which, in the fastened state, conforms to a fuel cell region.

The disclosure herein provides a fuel cell region for forming a fuel cell, wherein the fuel cell region is designed for holding an interconnector sheet by at least one fastening knob, by which the interconnector sheet can be gripped in a positive manner.

It is preferred that the fastening knob is of hemispherical, quarter-spherical or hook-like design.

It is preferred that the fuel cell region has a contact surface for a band-like region of an interconnector sheet, ensuring that the band-like region conforms to it in the fastened state of the interconnector sheet.

The disclosure herein provides a fuel cell, preferably a solid oxide fuel cell, for a fuel cell system, preferably of an aircraft, wherein the fuel cell has a previously described fuel cell region and a previously described interconnector sheet, wherein the interconnector sheet is held on the fastening knob by the holding eye.

The disclosure herein provides a method for producing an interconnector sheet for a fuel cell region, comprising the following steps:
  a) providing a flat metal sheet;
  b) cutting out a flat interconnector sheet blank to form at least one contact tongue, at least one connection region, and at least one holding eye; and
  c) bending the interconnector sheet blank into a three-dimensional shape corresponding to the contour of the fuel cell region in such a way that, in the installed state, the interconnector sheet conforms to the fuel cell region.

The disclosure herein provides a method for producing a fuel cell by producing an interconnector sheet, inserting the contact tongue of the interconnector sheet into a gas channel of the fuel cell and fastening the contact tongue to the gas channel wall.

The method preferably comprises a subsequent coating of the gas channel wall with an electrode coating, ensuring that the contact tongue is embedded in the electrode coating.

With a spiral configuration, a larger membrane surface, a smaller proportion of passive structures and a more scalable design can be created.

Instead of a round cross section, the spiral can also have a flat cross section without the function of the fuel cell being impaired in this case. The channels preferably comprise, on the elongate side, flat, non-curved subsections. In particular, the wall pieces of the channels are planes in these regions. This enables simplified integration of metallic interconnectors, especially if the contact surfaces have no curvatures.

Furthermore, fuel cell regions with an elongate basic shape can advantageously be combined to form larger systems. In this case, the installation space can be utilized particularly efficiently and almost completely. Overall, high volumetric power densities (watts/liter) can thus be achieved.

The encircling gas channels do not have to be flat. The channels can instead be arranged obliquely without impairing functioning. At the same time, the membrane surface can be enlarged with the same base element cross section. Increased power (watts) of the fuel cell element can thus be achieved.

Furthermore, the fuel cell regions can be produced by 3D printing methods for ceramics. In this case, there are technical limitations for geometries. As a rule, a flat surface parallel to the base surface cannot be printed without a so-called "support structure". However, it is possible to print overhangs up to a certain angle (stair principle). The oblique arrangement of the spiral channels makes the design easier to print.

Each fuel cell requires a supply of fuel gases and the discharge of the reaction product. In the case of high-temperature fuel cells, the air channel can also additionally be used for cooling the cell. It is thus possible to use two feeding channels and two discharging channels per cell unit. These are referred to as manifolds or distributor tubes and serve as gas connections of the element. The distribution tubes can be integrated in the middle of the spiral design. Advantageously, the connecting pieces can thus also be printed directly at the same time in the 3D printing process. No further components are required.

In addition, a compact construction can be achieved by utilizing the inner region of the spiral for gas supply and discharge. As a result, the power density can be improved, especially in comparison with designs which require additional elements.

The central gas supply of the printed "manifolds" makes it possible to supply and discharge the gases in several planes. This allows the design to be scaled beyond the gas depletion in the channels. This is because normally the channel length is limited since the fresh gases are consumed while the reaction product accumulates. Above a certain channel length, effective operation of the cell becomes difficult since a longer channel can no longer make a significant contribution to the further conversion of the gases. This can be avoided by connecting a plurality of parallel-connected spiral elements to the feeding and discharging channels. The length of the fuel cell element of spiral design is thus theoretically unlimited since each subsection can be supplied with fresh gases. The discharge of gas is also possible in the same way. It is thus possible to produce larger individual cells, which is advantageous particularly for high-power systems.

If the coatings of the membranes are also divided into subsections and led out of the spiral in an electrically individual manner, a separate electrical cell voltage potential can be obtained for each subsection. As a result, series connection is possible as in the case of conventional stacks. It is thus possible to create a stack which can be produced in a 3D printing process in one piece and requires no additional seal between the membrane sections. In this way, the weight of the unit and the proportion of the structure that actively contributes to energy conversion can be reduced.

Furthermore, the design is advantageous for the attachment of metallic interconnectors for extracting the electrical energy.

The electrode coatings which usually form the anode and cathode of the fuel cell regions normally have a limited conductivity. The cathode material in particular has a very low conductivity compared with metals. The charge carriers which are split off on the surfaces or recombined on them must be transported between the electrodes in order to close the circuit. The load or energy consumer is integrated into this circuit. Since the current flow takes place in the plane of the thin electrode coating and the effective conductor cross section of the electrodes is comparatively small owing to the small layer thicknesses of, normally, 50 µm to 400 µm, significant ohmic losses can occur here. In order to increase the efficiency of fuel cell operation, these losses should be minimized as much as possible. Metallic meshes, for example nickel braids, are usually applied to the electrode coating.

Solid oxide fuel cells (SOFCs) with internal membrane structures which are produced by 3D printing are not easily accessible from the outside. Only electrode coatings can be applied to the internal structures. This can be accomplished by powder coating with small particles, for example. Until now, it has not been possible to print solid metallic structures at the same time. As a solution, a metallic interconnector structure which can be combined with the ceramic main body for the purpose of making electrode contact is proposed.

The typical operating temperatures of high-temperature fuel cells are up to 1000° C. This is a challenge for the materials but also for the buildup and connection technology. Seals can be obtained with glass solders. An operationally stable connection between metallic interconnectors and delicate ceramic structures is possible, but difficult. Thus, at the typical temperatures, no conventional adhesives are available; screws can likewise be complicated in the case of porous materials and, in addition, may undesirably increase the weight. Nonpositive connections effected by utilizing spring forces, such as snap or clip connections, are likewise almost impossible to achieve since the spring constants may be too low at the operating temperatures of the SOFS.

One idea is therefore to attach metallic bent parts to the fuel cell by a positive connection and to seal them with glass solder. The use of metal alloys matched to the coefficient of expansion of the ceramic base material makes it possible to avoid additional constraining forces. The material Crofer-22-APU obtainable from VDM as a plate material can be used, for example.

For a positive connection, structures on the ceramic body which allow the metallic elements to be hooked in are proposed. However, current 3D printing processes have limitations in this regard, and the shape should therefore be selected accordingly. Spherical surfaces, for example, are readily possible in all lengths. It is therefore preferable to use hemispherical "knobs" with which metal strips can be positioned. This principle can be extended to the extent that hooking of the metal sheet in the direction of tension is made possible. For this purpose, the hemispherical structure can be divided again. The holding force can be further increased by beveling. Overall, the sheet metal parts intended as interconnectors can then hold themselves, with the result that the assembly of the fuel cell can be facilitated.

The maximum current flow produced by the cell depends, inter alia, on the membrane surface area. Since the conductivity in the electrode layers is limited, the metallic contacts are preferably repeated at a certain spacing. This can be ensured by a comb-shaped basic structure, which in principle is not limited in its repeated pattern and thus does not limit the dimensions of the target design.

Furthermore, a certain compensating movement can be made possible by the comb-like structure. This can help relieve material stresses and avoid delamination between the metallic interconnector and the ceramic with the electrode coating. It is thus also possible to compensate for small differences between the coefficients of expansion of the materials.

The electrical connection between the interconnector metal and the electrode can be produced by first assembling the sheets with the ceramic and then coating the electrode. In this case, the contact tongues are embedded directly in the electrode material at the same time and thus also connected to the ceramic base material.

The interconnectors are required in large numbers and should be designed in such a way that a mass production method can be used. The sheets can be cut out of sheets by various production methods, such as micro water jet cutting, punching or laser beam cutting. Additional shaping by bending devices is likewise possible. By virtue of the special design, the number and length of contact tongues required for functioning do not conflict with manufacturability. Moreover, no further process is required to assemble the sheet metal parts from a plurality of components. The interconnector sheet can be produced in one piece.

The sheet metal interconnectors are particularly suitable for the high-temperature fuel cell described herein, but can also be applied to other similar architectures.

The pitch of the spiral in the sheet metal blank can be taken into account in such a way that a horizontal connection results which can easily be connected to further connections. An electrically conductive threaded rod is conceivable, for example. The sheet metal elements can be attached piece by piece to the ceramic body and thereby enable separate contacting of the positive and negative potentials. The contact tongues preferably project directly over the active membrane surfaces through openings in the ceramic. The electrode materials can be applied subsequently.

The remaining openings can be closed with glass solder, as is customary with high-temperature fuel cells. In addition, prefabricated glass films with a corresponding hole pattern can be applied to the ceramic before the sheet metal parts are applied. This enables improved sealing and "glues" the sheet metal parts additionally to the electrolyte. In the final manufacturing step, the glass portions can be melted in a furnace in order to achieve the desired sealing between the metal and the ceramic.

Another example has a hexagonal basic structure. Comparatively uniform shrinkage in the sintering process can be achieved by symmetrical configuration. As a result, the fuel cell body is less prone to cracking and the manufacturing process is more stable overall. These elements can also be arranged very compactly in space, thereby making it possible to further improve the achievable power density.

The membrane surfaces thus continue to have flat partial segments which can be brought into good contact with flat sheet metal parts. The proportion of curved surfaces is further reduced in comparison with other embodiments. The usable membrane surface can thereby be increased further as a proportion.

The gas can be supplied in a segmented flue. This can improve the gas guidance in lined-up elements in a simple manner.

The outer surface of the fuel cell preferably has a circumferential groove, into which a wire can be inserted. The groove, like a thread, is machined continuously into the outer surface. A wire for contacting the interconnector sheets can be wound around the cell along this groove. This wire can fix the sheets and/or can be used as an electrical arrester.

Once again, simple bent sheet metal parts, which are inserted through openings in the fuel cell structure, can function as interconnector sheets. In a further step, the wire can be attached. The wire can be spot-welded to the sheets by suitable welding methods (e.g. TIG or microplasma welding). The remaining openings can be sealed by glass solder.

This procedure results in a positive-locking structure comprising the fuel cell and interconnector sheets. The temperature-stable, materially bonded connection of interconnectors and arrester wire can enable high stability and good efficiency.

BRIEF DESCRIPTION OF THE DRAWINGS

Example embodiments of the disclosure herein are explained in greater detail below with reference to the attached schematic drawings. In the drawings.

DETAILED DESCRIPTION

Figure 1:
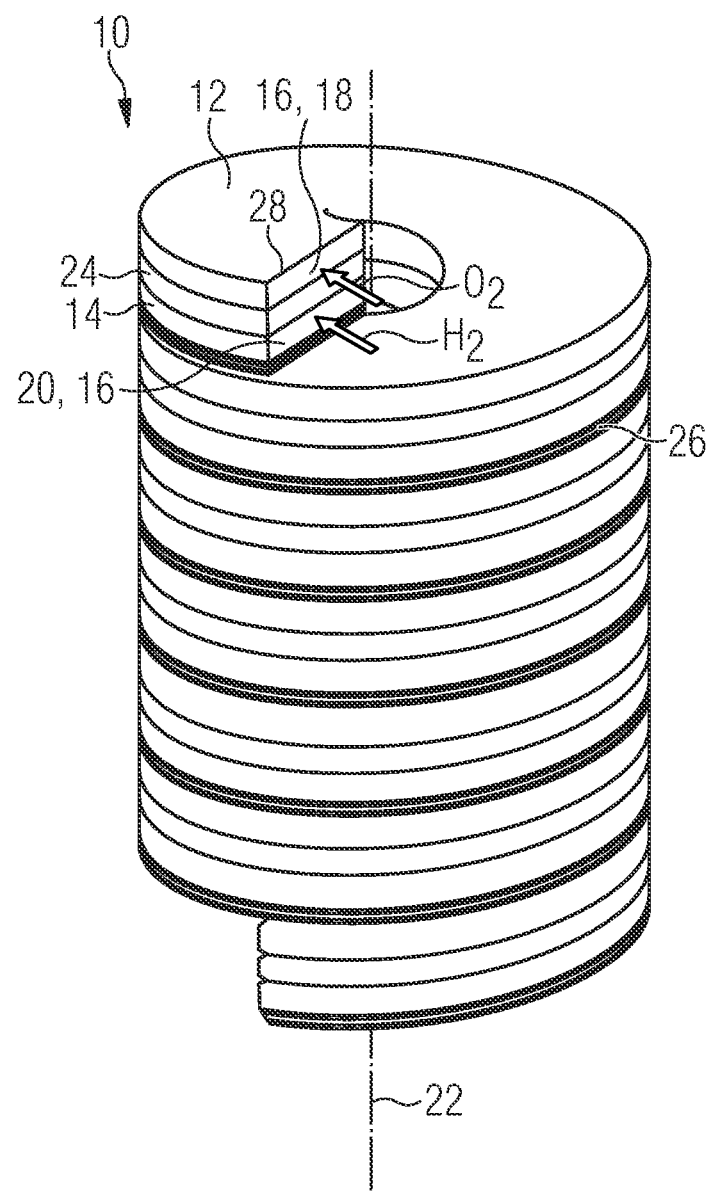
FIG. 1 shows an example of a spiral fuel cell.

Reference is made first of all to FIG. 1, which shows an example of a fuel cell 10. The fuel cell 10 has a first fuel cell region 12 and a second fuel cell region 14. Each fuel cell region 12, 14 contains a gas channel 16.

The first fuel cell region 12 comprises a first gas channel 18, e.g. for an oxidizer, and the second fuel cell region 14 comprises a second gas channel 20, e.g. for fuel.

The first gas channel 18 and the second gas channel 20 extend spirally in a circumferential direction about a construction axis 22. Here, the construction axis 22 extends in the center of the spiral.

The first gas channel 18 and the second gas channel 20 are connected to one another along their direction of extent by an ion-conductive separating layer 24. Furthermore, an insulation layer 26 is arranged in order to prevent a cell short circuit.

Each gas channel 16 may include an electrode coating 28 to extract the generated electrical energy from the fuel cell 10.

Figure 2:
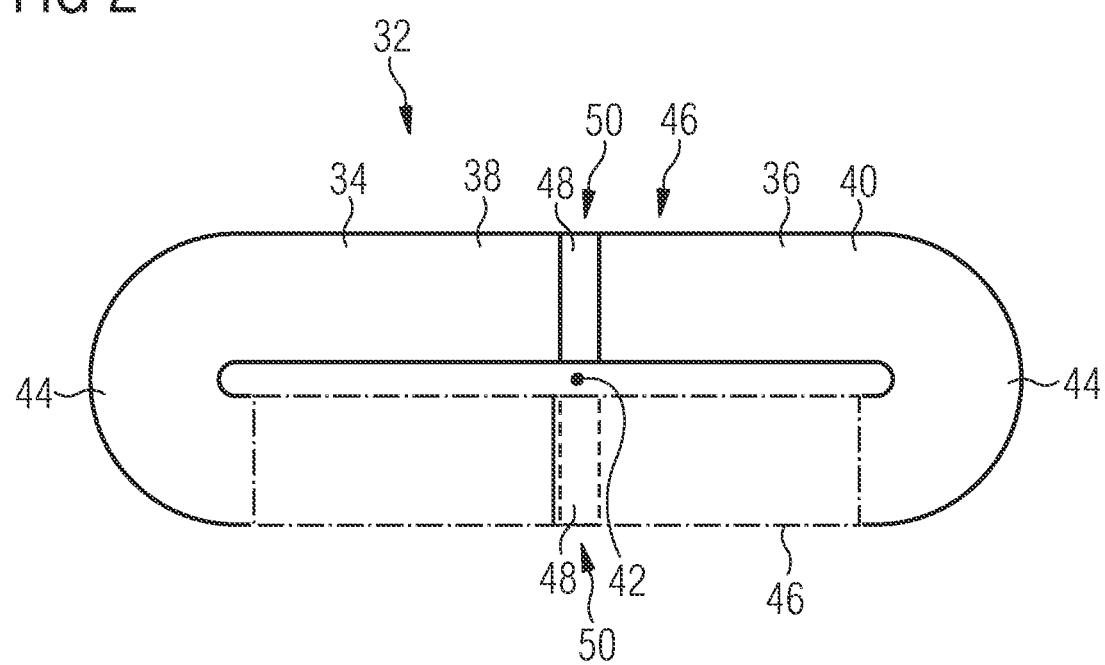
FIG. 2 shows an example of a flat fuel cell region.
Figure 3:
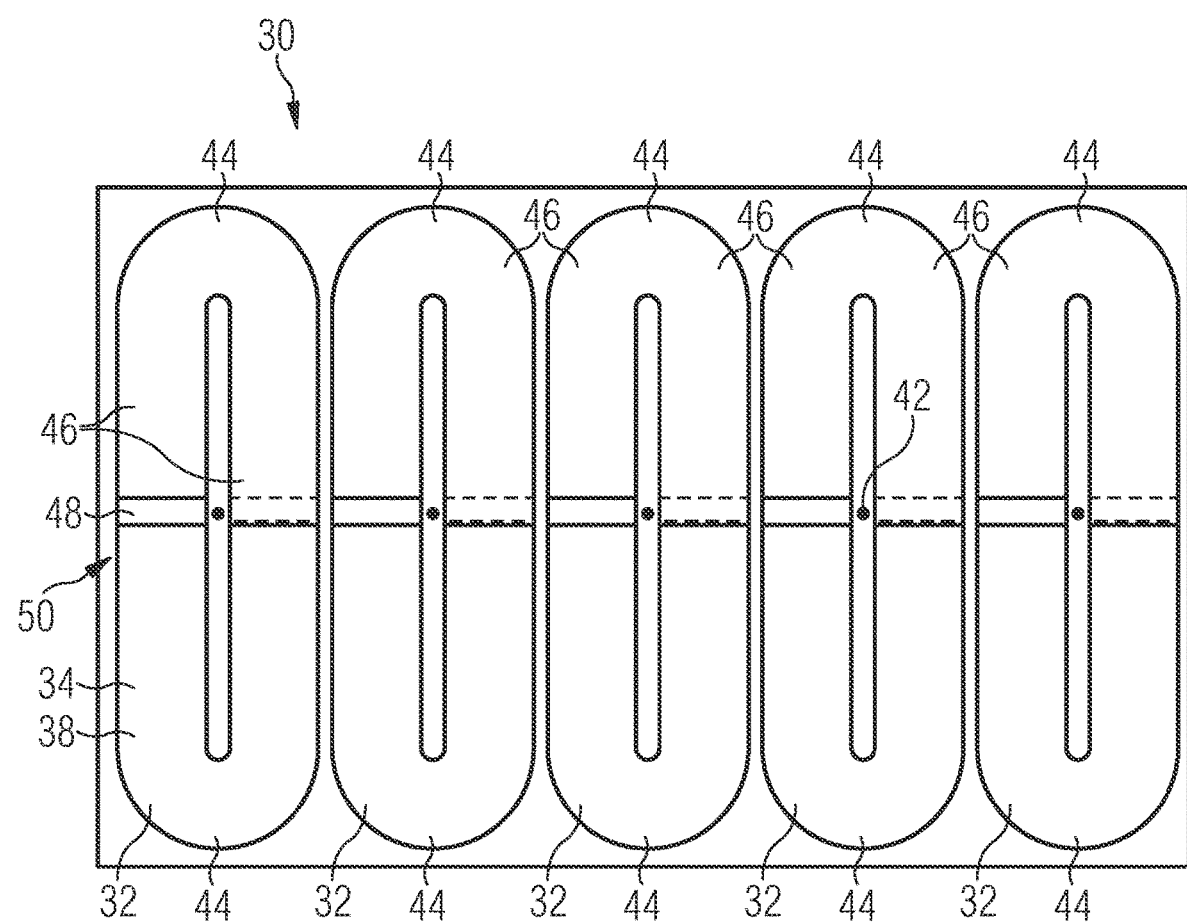
FIG. 3 shows a plurality of fuel cell regions.
Figure 4:
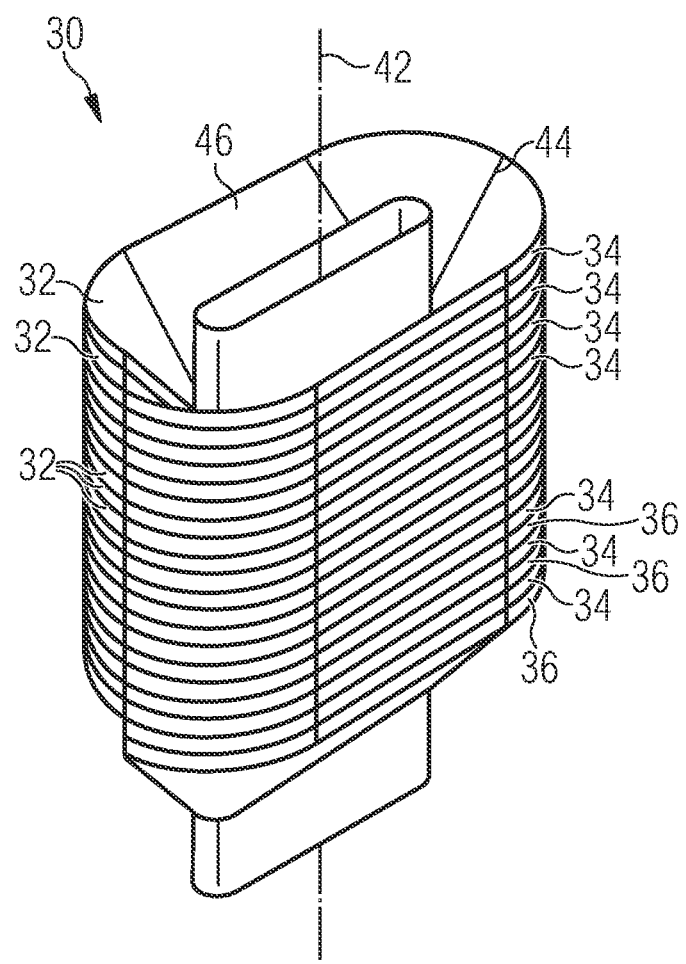
FIG. 4 shows an example of a fuel cell from the fuel cell regions of FIG. 2.

Reference is made to FIGS. 2 through 4, which show an example of a fuel cell 30. The fuel cell 30 comprises a plurality of fuel cell regions 32. In this case, a first fuel cell region 34 and a second fuel cell region 36 can be designed as one piece.

Each fuel cell region 32 comprises a first gas channel 38 and a second gas channel 40, respectively. The fuel cell region 32 is designed in such a way that the gas channels 38, 40 extend in the circumferential direction around a construction axis 42. In FIGS. 2 and 3, the construction axis 42 is perpendicular to the plane of the drawing.

Each of the gas channels 38, 40 has a gas channel curvature region 44 and an adjoining gas channel plane region 46. The gas channel curvature region 44 is preferably curved by 180°. The gas channel plane region 46 is straight and without any curvature, resulting in an elongate oval shape of the fuel cell region 32.

The first gas channel 38 and the second gas channel 40 each have a gas inlet region 48. The gas inlet region 48 can be seen in the plan view of FIGS. 2 and 3 and is not shown specifically in FIG. 4. In FIG. 4, the gas inlet region 48 is oriented upward. The gas inlet region 48 is arranged in the middle of the gas channel plane region 46, for example. The gas inlet region 48 is preferably arranged in such a way that, for example, when a further fuel cell region 32 is arranged along the construction axis 42, the gas inlet region 48 is fluidically connected to the respective gas channel 38, 40 of the further fuel cell region 32.

The first gas channel 38 and the second gas channel 40 each have a gas outlet region 50. In the plan view of FIGS. 2 and 3, the gas outlet region 50 is below the plane of the drawing and can therefore not be seen. In FIG. 4, the gas outlet region 50 is oriented downward. The gas outlet region 50 is arranged in the middle of the gas channel plane region 46, for example. The gas outlet region 50 is preferably arranged in such a way that, for example, when a further fuel cell region 32 is arranged along the construction axis 42, the gas inlet region 48 is fluidically connected to the gas outlet region 50 of the respective gas channel 38, 40 of the further fuel cell region 32.

Each gas channel 38, 40 may include an electrode coating 52 to extract the generated electrical energy from the fuel cell 30.

Overall, a continuous first gas channel 38 and second gas channel 40 can be formed in this way. Thus, the effective area is significantly increased and the volumetric power density can be increased.

Figure 5:
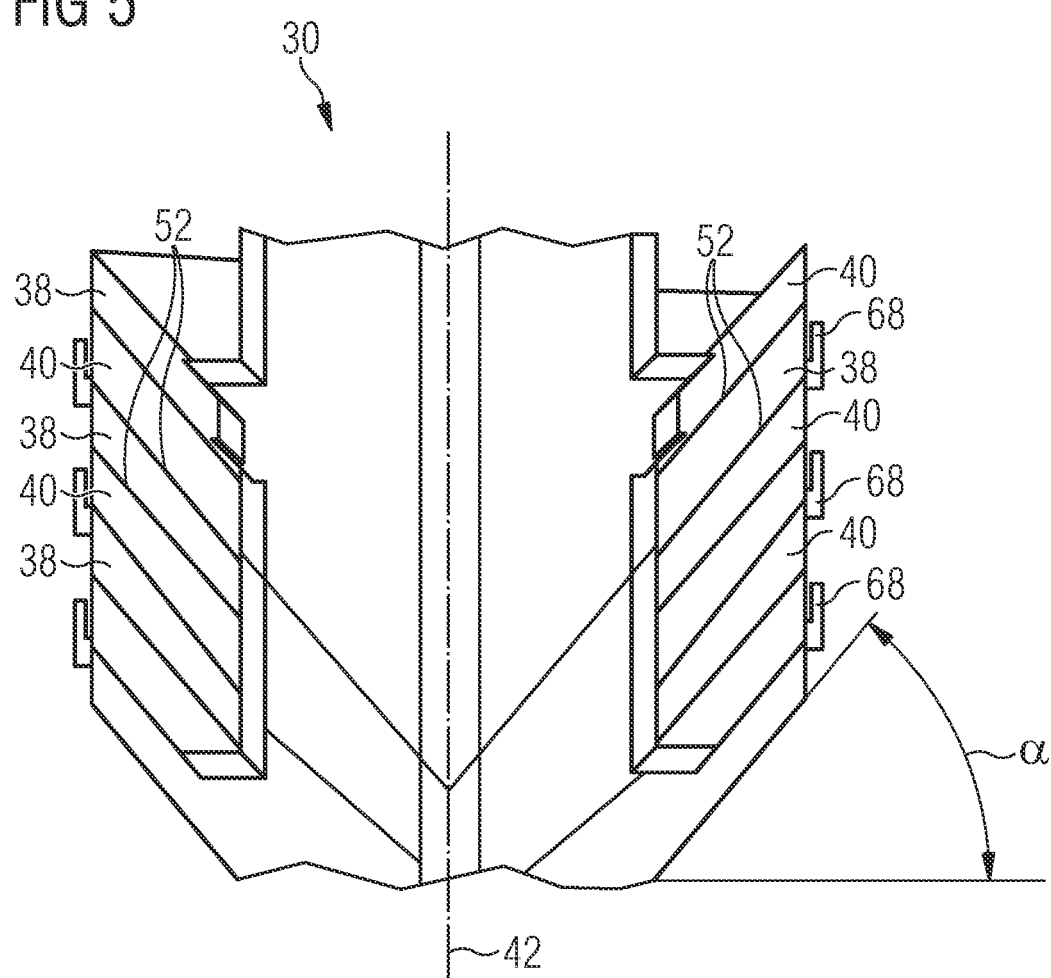
FIG. 5 shows a section through the fuel cell of FIG. 4.

As illustrated in FIG. 5, the gas channels 38, 40 may be formed at an angle α relative to the horizontal direction. With this embodiment, production by 3D printing can be simplified because fewer or no support structures are required.

Figure 6:
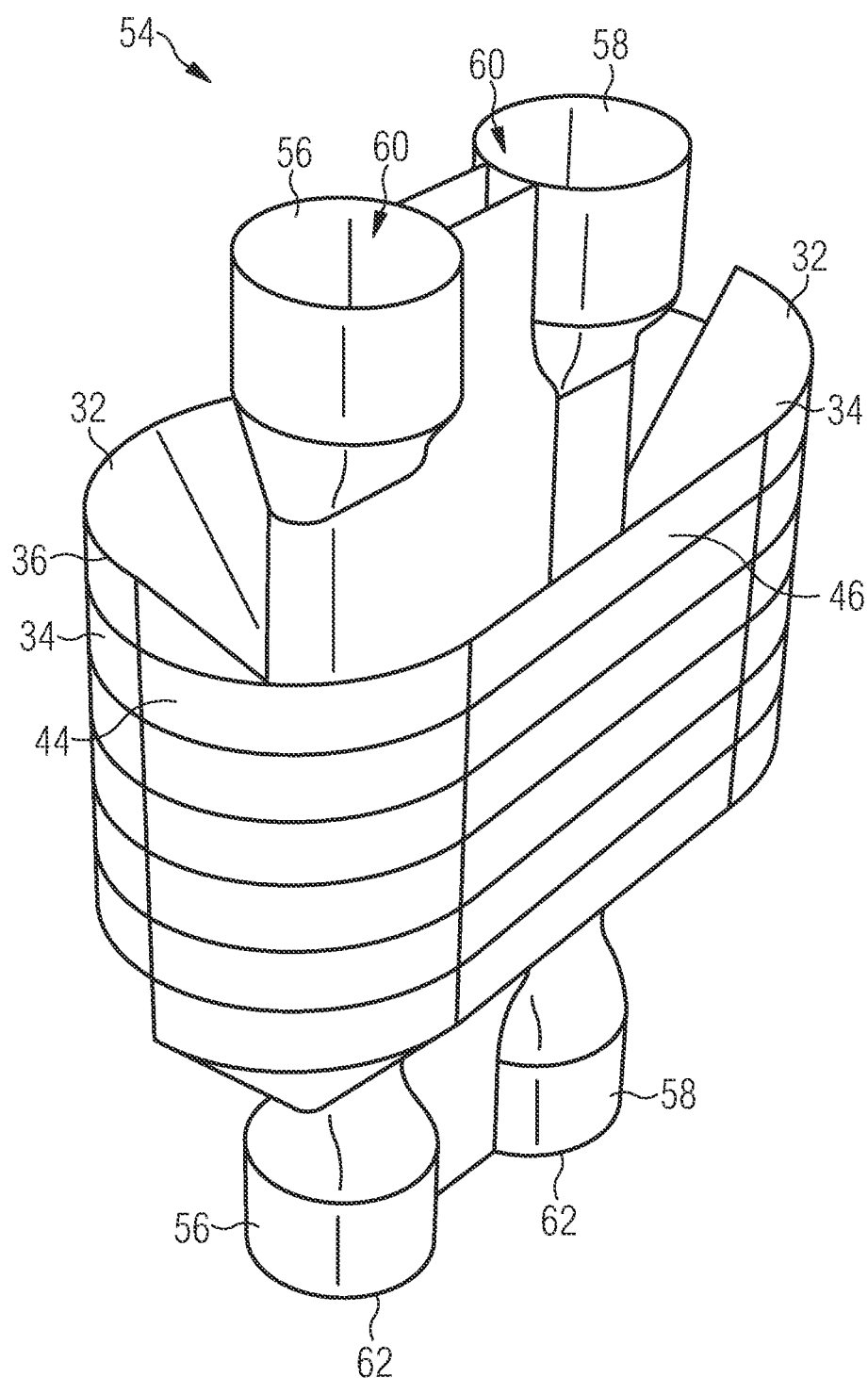
FIG. 6 shows another example of a fuel cell.
Figure 7:
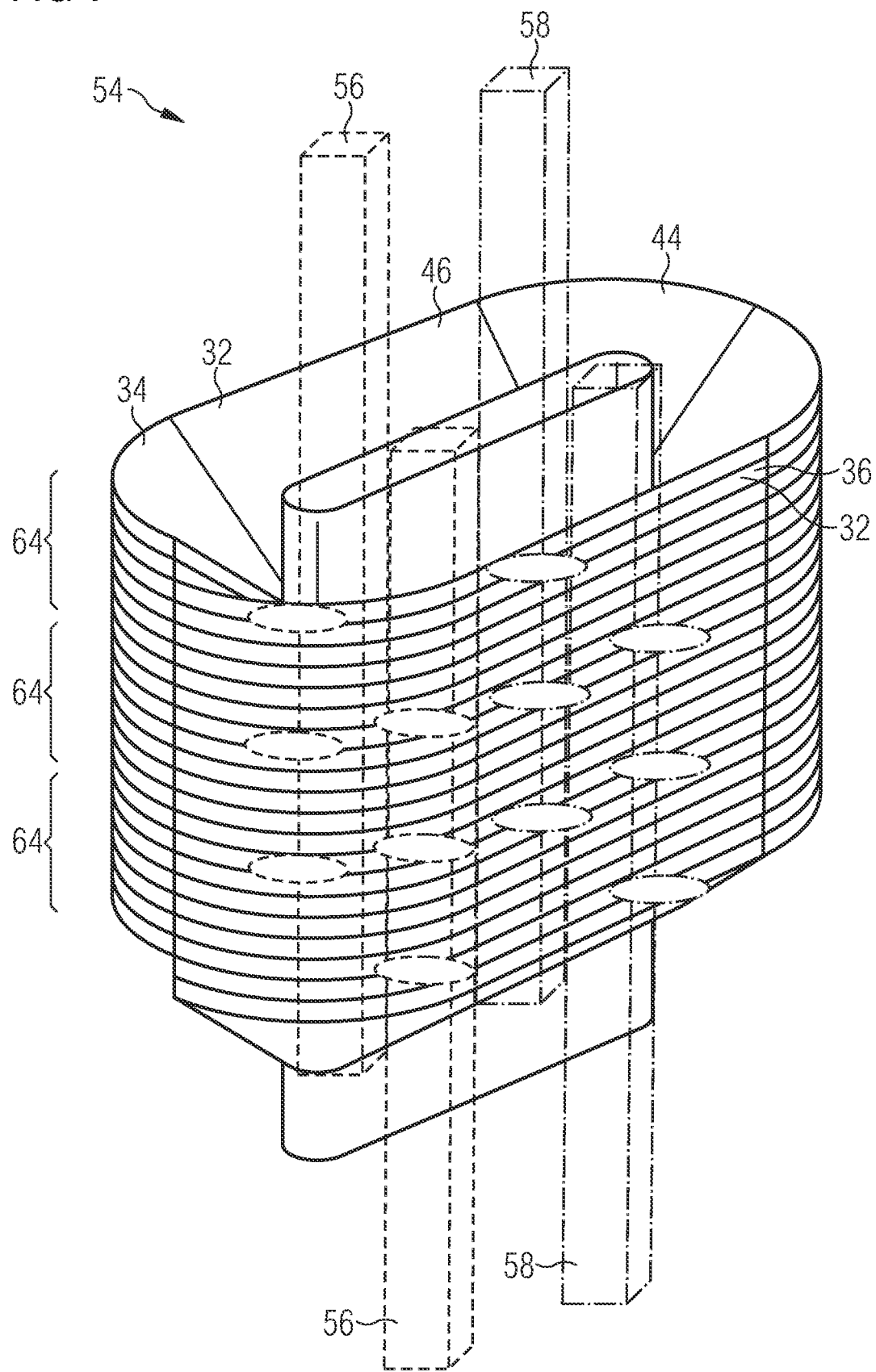
FIG. 7 shows a schematic view of the gas supply to the fuel cell of FIG. 6.
Figure 8:
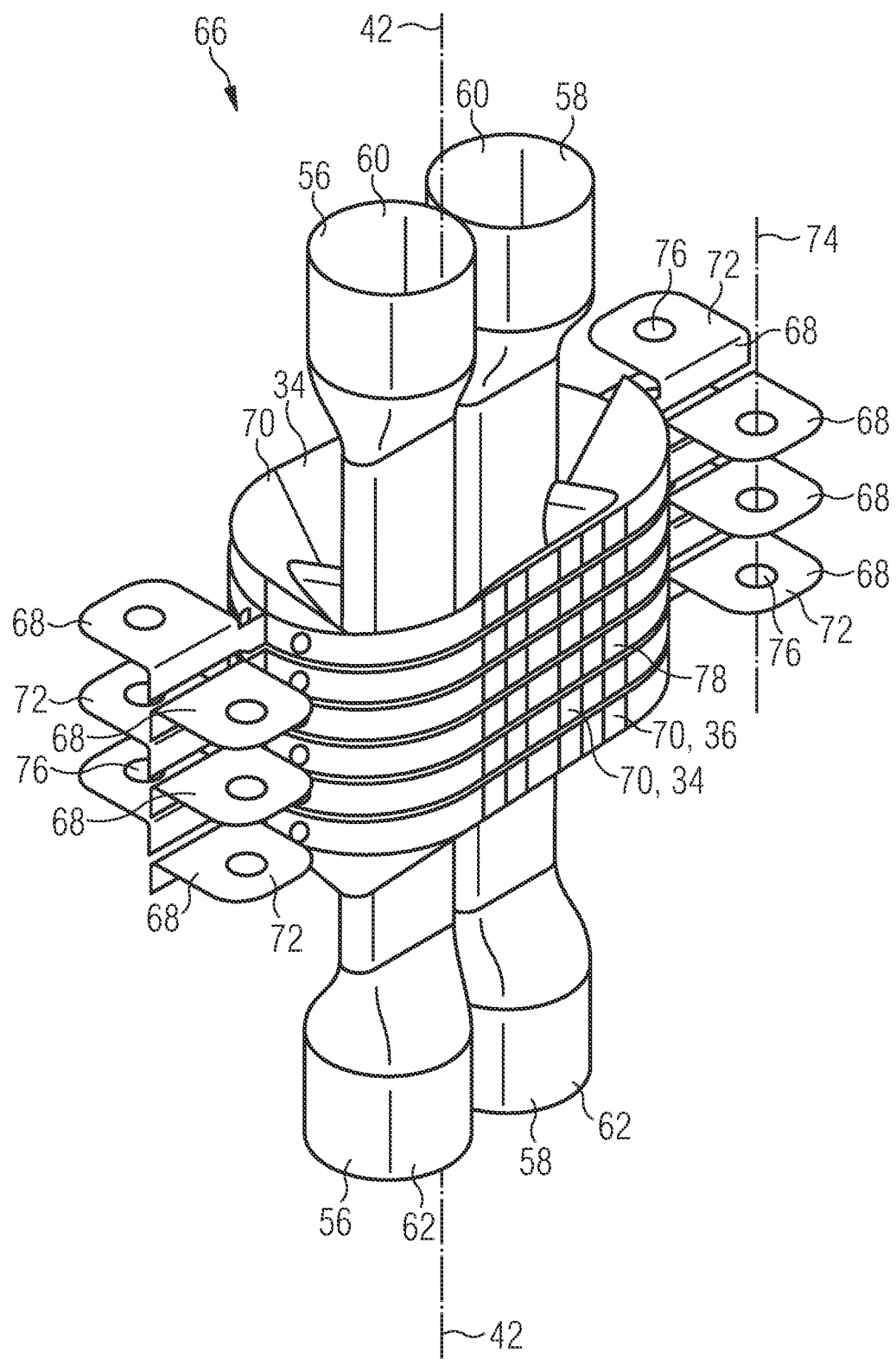
FIG. 8 through FIG. 12 show an example embodiment of a fuel cell with interconnector sheets.
Figure 9:
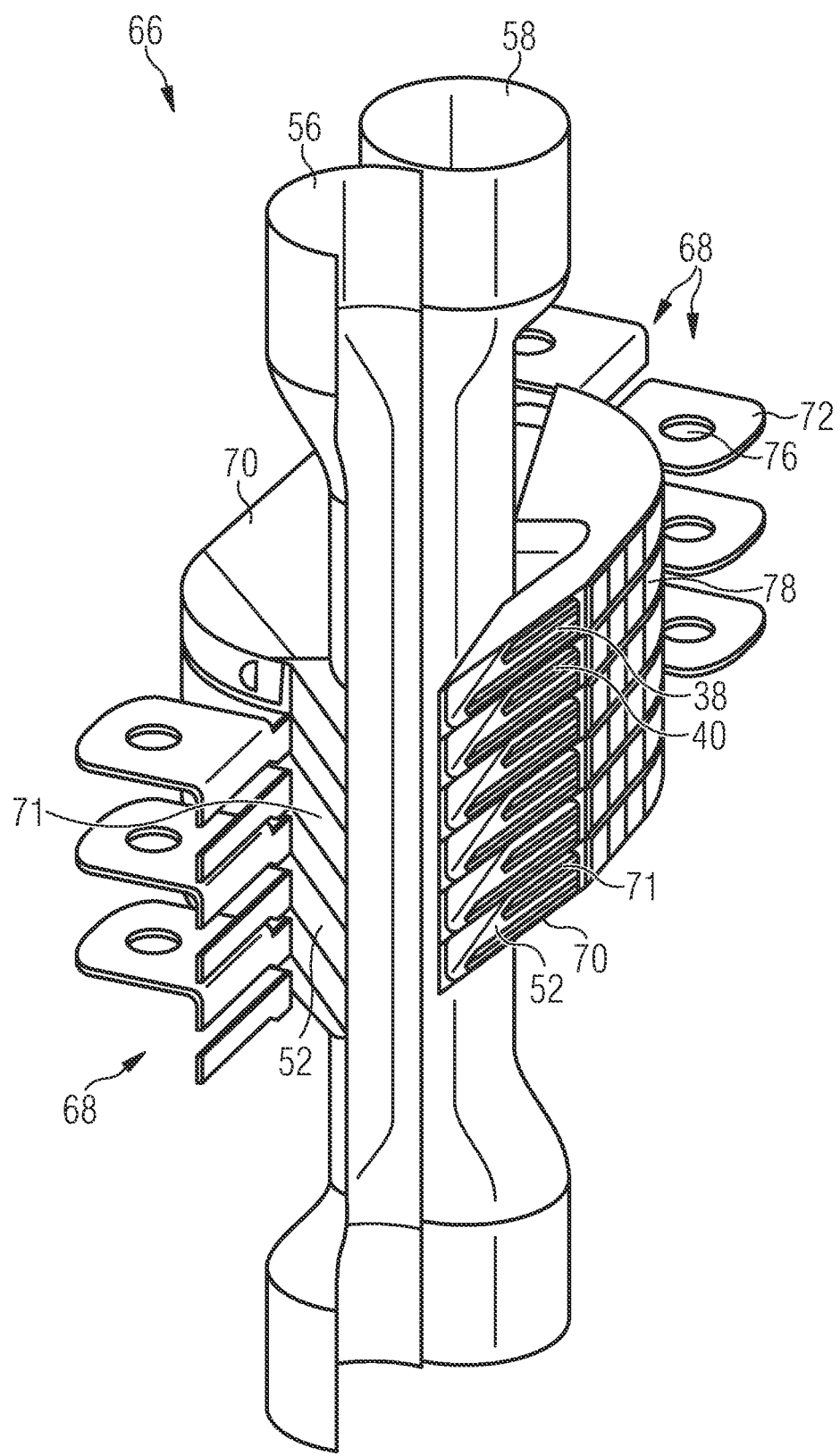
Figure 10:
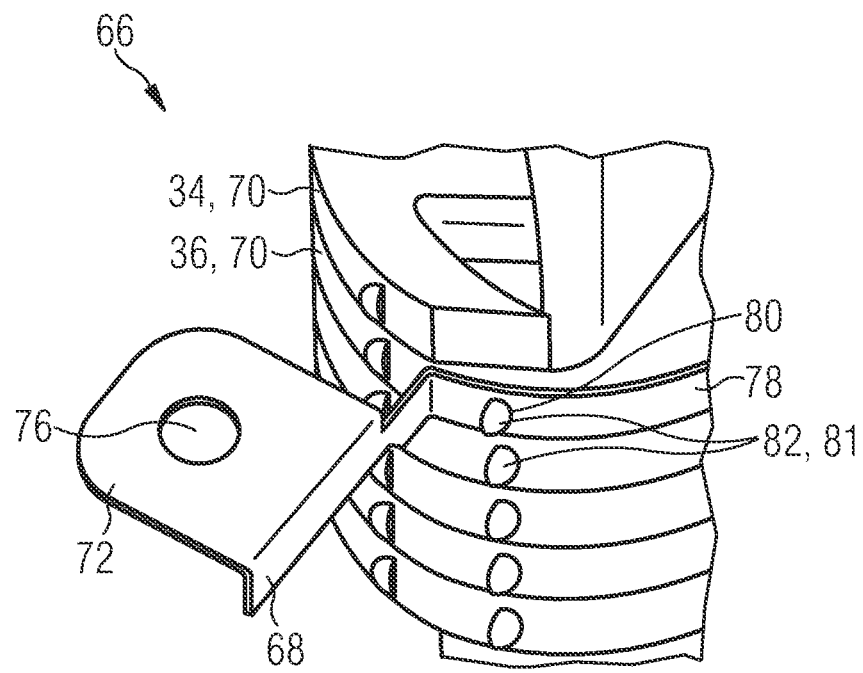
Figure 11:
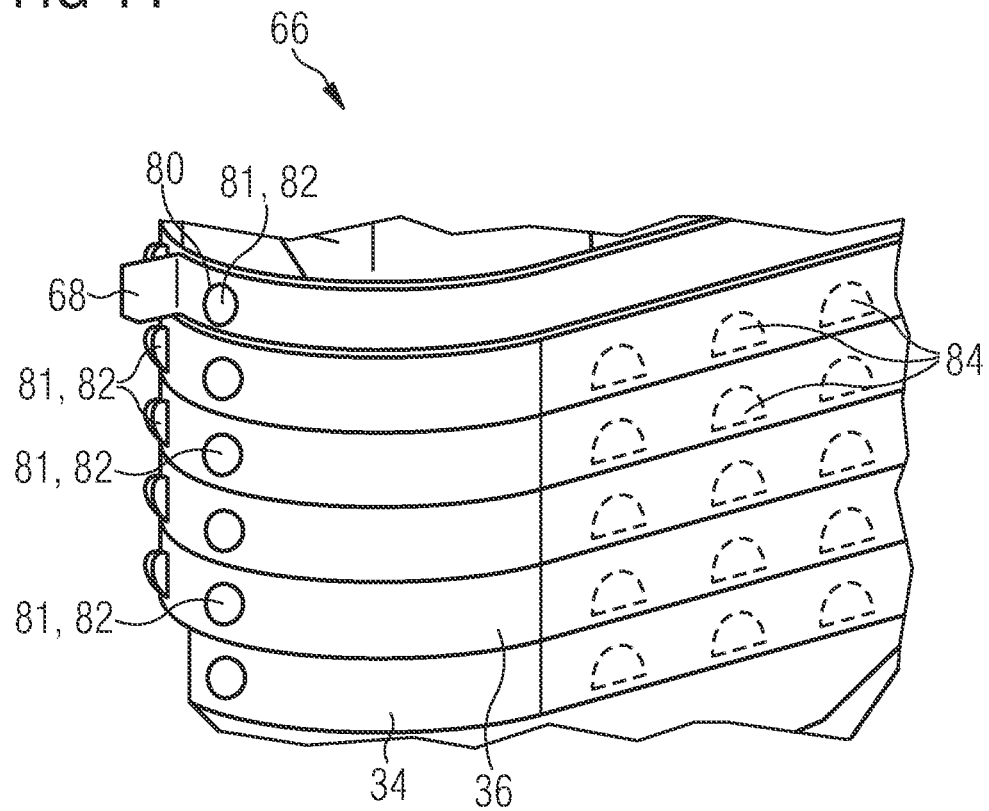
Figure 12:
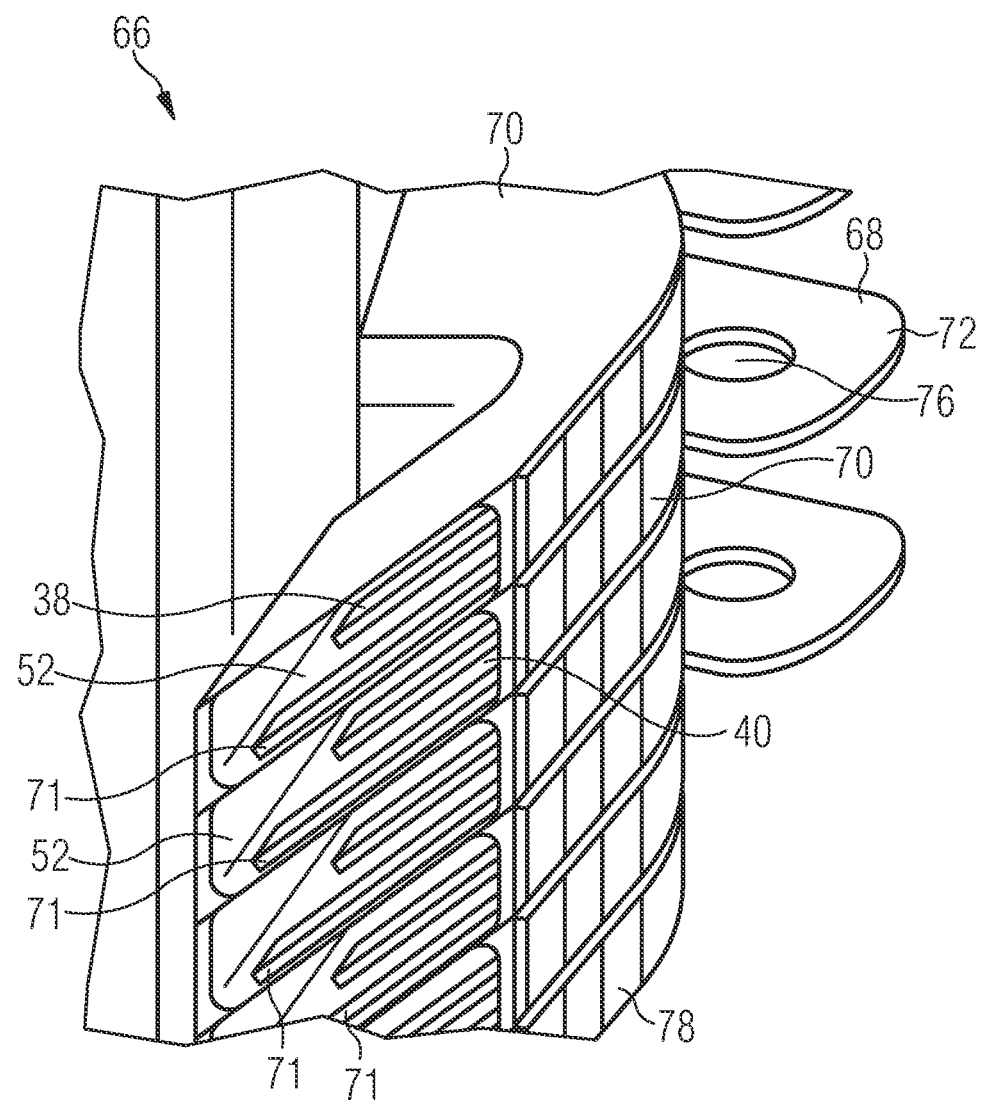
Figure 13:
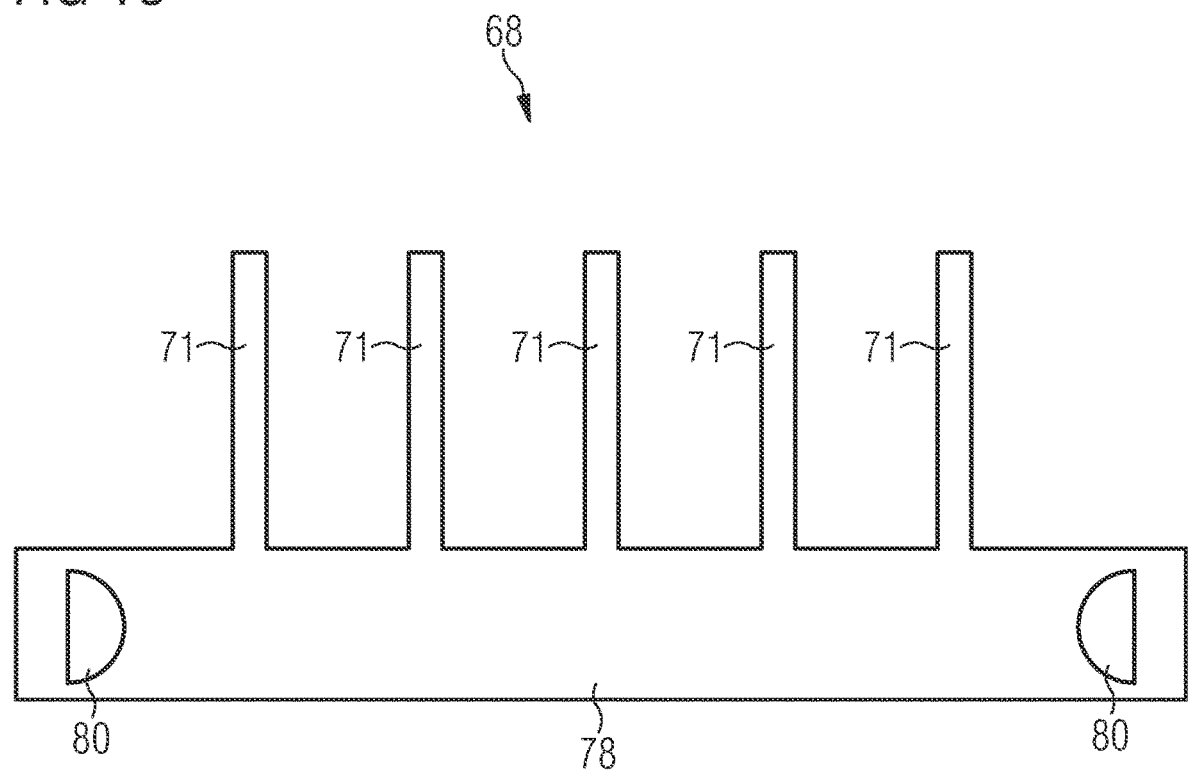
FIG. 13 shows an example of an interconnector sheet.
Figure 14:
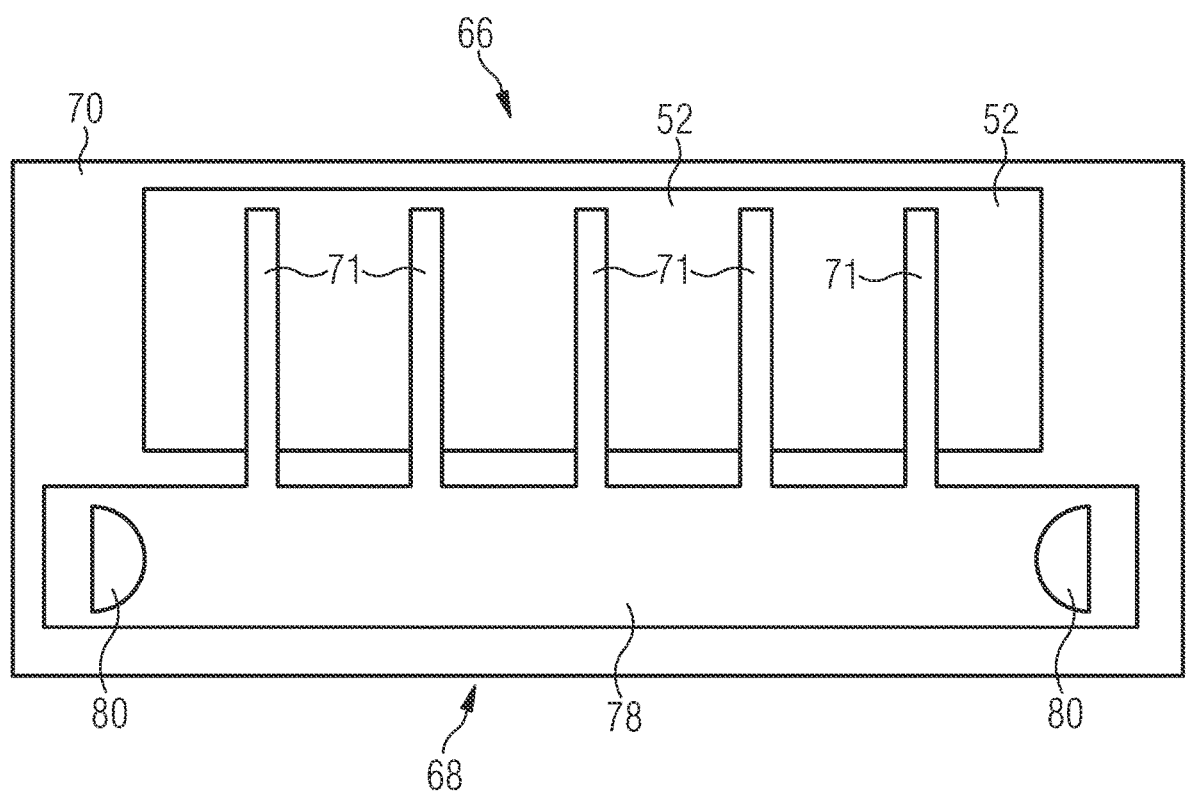
FIG. 14 shows the interconnector sheet of FIG. 13 in the installed state.

Reference is made to FIGS. 6 and 7, which show an example of a fuel cell 54 in different variants. The fuel cell 54 comprises a plurality of fuel cell regions 32, a first distribution tube 56, and a second distribution tube 58. The first distribution tube 56 can be provided for the fuel, while the second distribution tube 58 can be provided for the oxidizer.

The distribution tubes 56, 58 are arranged in a region which is surrounded or, as seen in plan view, enclosed by the gas channels 38, 40. In the present case, the distribution tubes 56, 58 extend parallel to the construction axis 42.

Each distribution tube 56, 58 has a gas supply region 60, which can be designed to be connectable to a gas reservoir. In the case of the oxidizer, the gas supply region 60 can serve for air supply without a gas reservoir.

In addition, each distribution tube 56, 58 has a gas discharge region 62, from which unused residual gas and reaction product can emerge.

In the variant shown in FIG. 6, the first distribution tube 56 serves to distribute the fuel and the second distribution tube 58 serves to distribute the oxidizer. In this variant, the first distribution tube 56 forms a continuous fluid path with the first gas channel 38 and the second distribution tube 58 forms a continuous fluid path with the second gas channel 40.

In the variant shown in FIG. 7, the fuel cell 54 is divided into three subsections 64, for example. Each subsection 64 is supplied with fuel and oxidizer through the distribution tubes 56, 58 independently of the other subsections 64.

Reference is made to FIG. 8 through FIG. 14, which show an example of a fuel cell 66. Fuel cell 66 is similar in design to fuel cell 54 and additionally comprises a plurality of interconnector sheets 68. Each interconnector sheet 68 is arranged on a fuel cell region 70 of the fuel cell 64. The generated electrical energy can be extracted by the interconnector sheets 68.

The interconnector sheet 68 comprises a plurality of contact tongues 71. Each contact tongue 71 projects either into the first gas channel 38 or into the second gas channel 40. The contact tongues 71 are fastened to the wall of the respective gas channel 38, 40. The electrode coating 52 is preferably arranged in such a way that the contact tongues 71 are embedded in the electrode coating 52.

Each interconnector sheet 68 further comprises an electrical connection region 72. The connection regions 72 are designed in such a way that they can be electrically connected along a connection axis 74 by a threaded rod. Each connection region 72 may have a connection opening 76 for the threaded rod. In other words, the connection openings 76 of the connection regions 72 are aligned.

Each interconnector sheet 68 has a band-like region 78. The band-like region 78 is matched to the contour of the fuel cell region 70 in such a way that the band-like region 78 conforms to the fuel cell region 32. The band-like region 78 is preferably of C-shaped design. A holding eye 80 is arranged at each of the opposite ends of the band-like region 78.

The fuel cell region 70 comprises a holding device 81 which fits the holding eyes 80 in order to hold the interconnector sheet 68. The holding device 81 has fastening knobs 82 in order to produce a positive connection to the holding eyes 80.

Each fastening knob 82 is arranged on an outer circumferential surface of the fuel cell region 70. The fastening knob 72 is preferably of substantially hemispherical design. The interconnector sheets 68 can be secured on the fuel cell region 70 by glass solder. In this case, the glass solder can seal any remaining openings.

The fuel cell region 70 further comprises an aperture 84 for each contact tongue 71.

Figure 15:
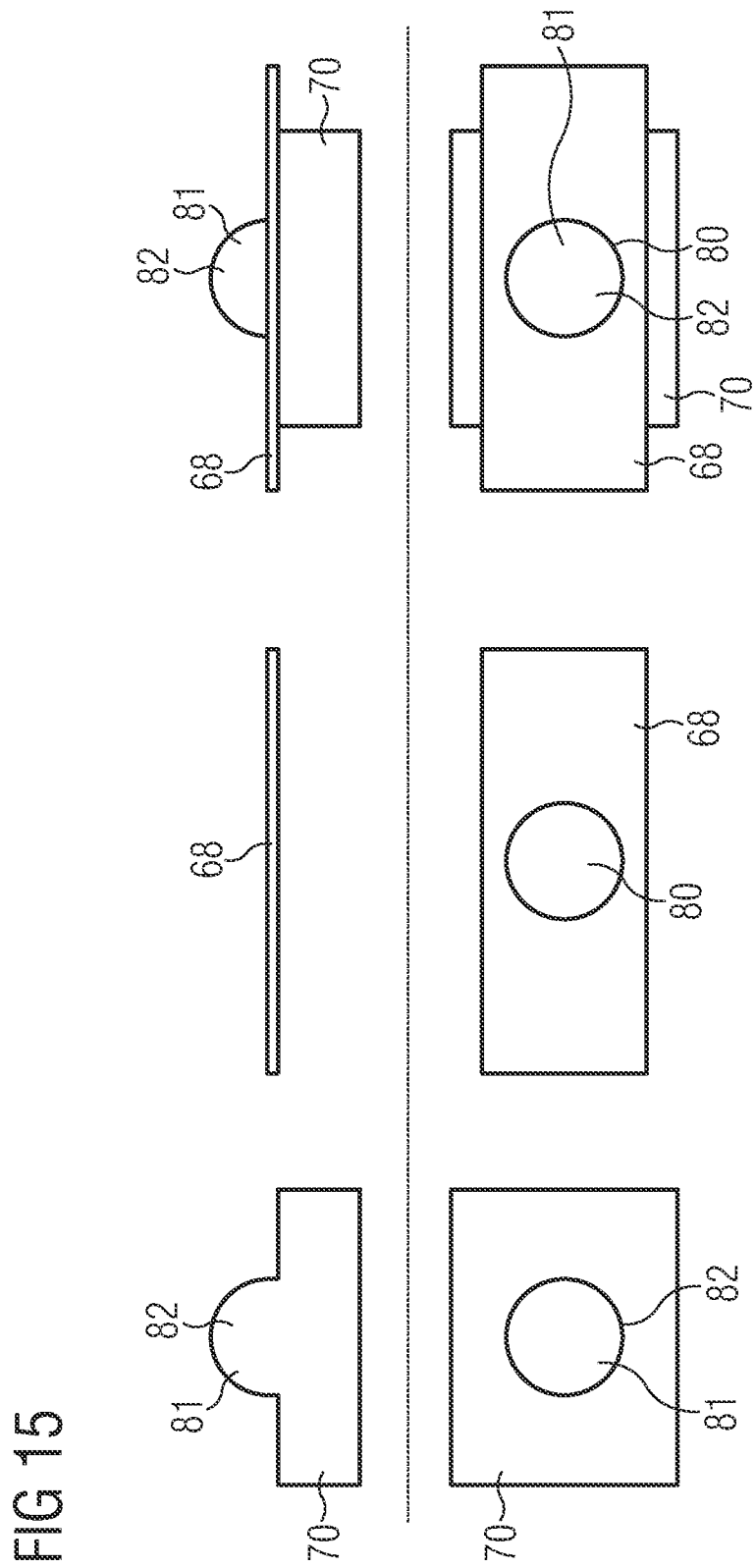
FIG. 15 through FIG. 17 show example embodiments of a fastening of the interconnector sheet.
Figure 16:
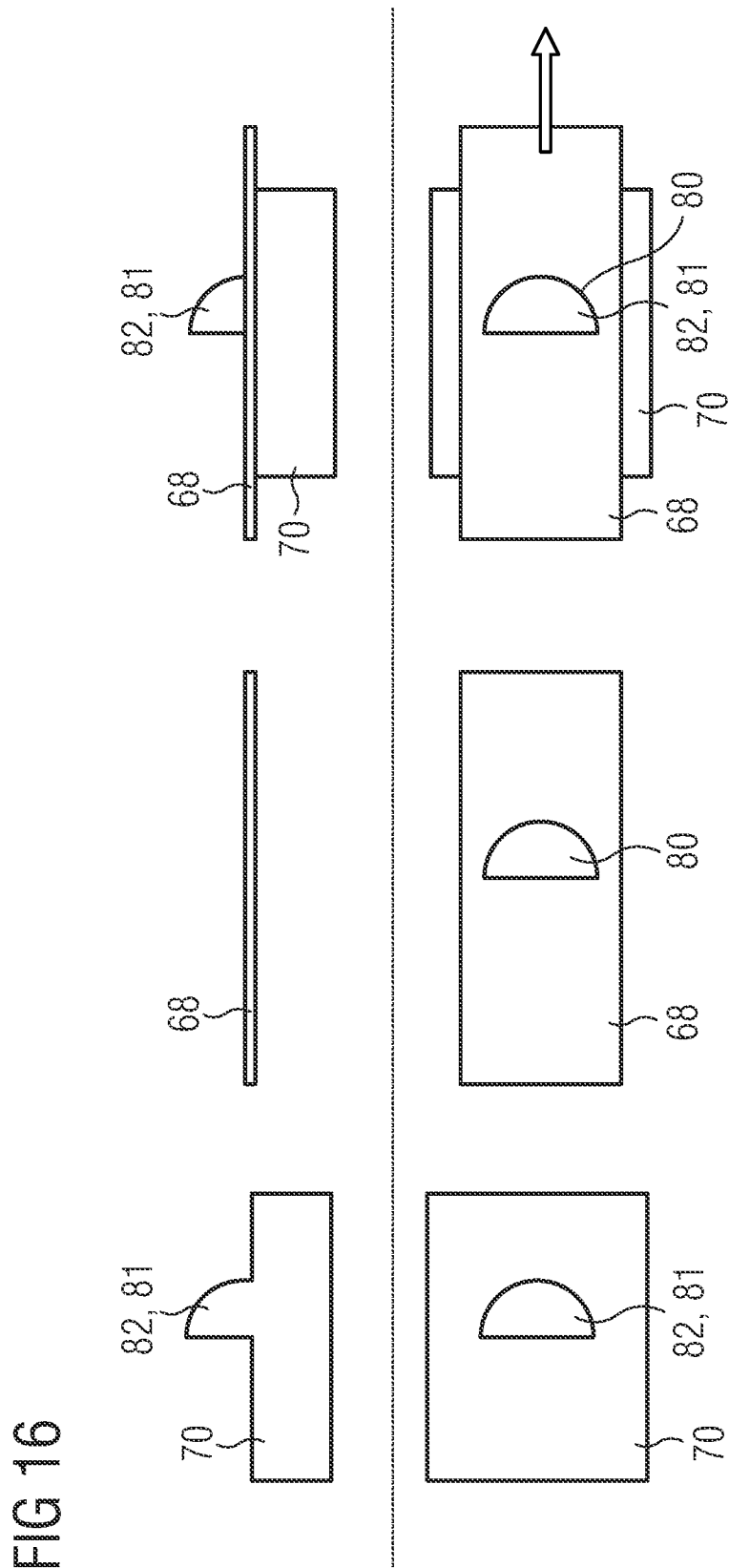
Figure 17:
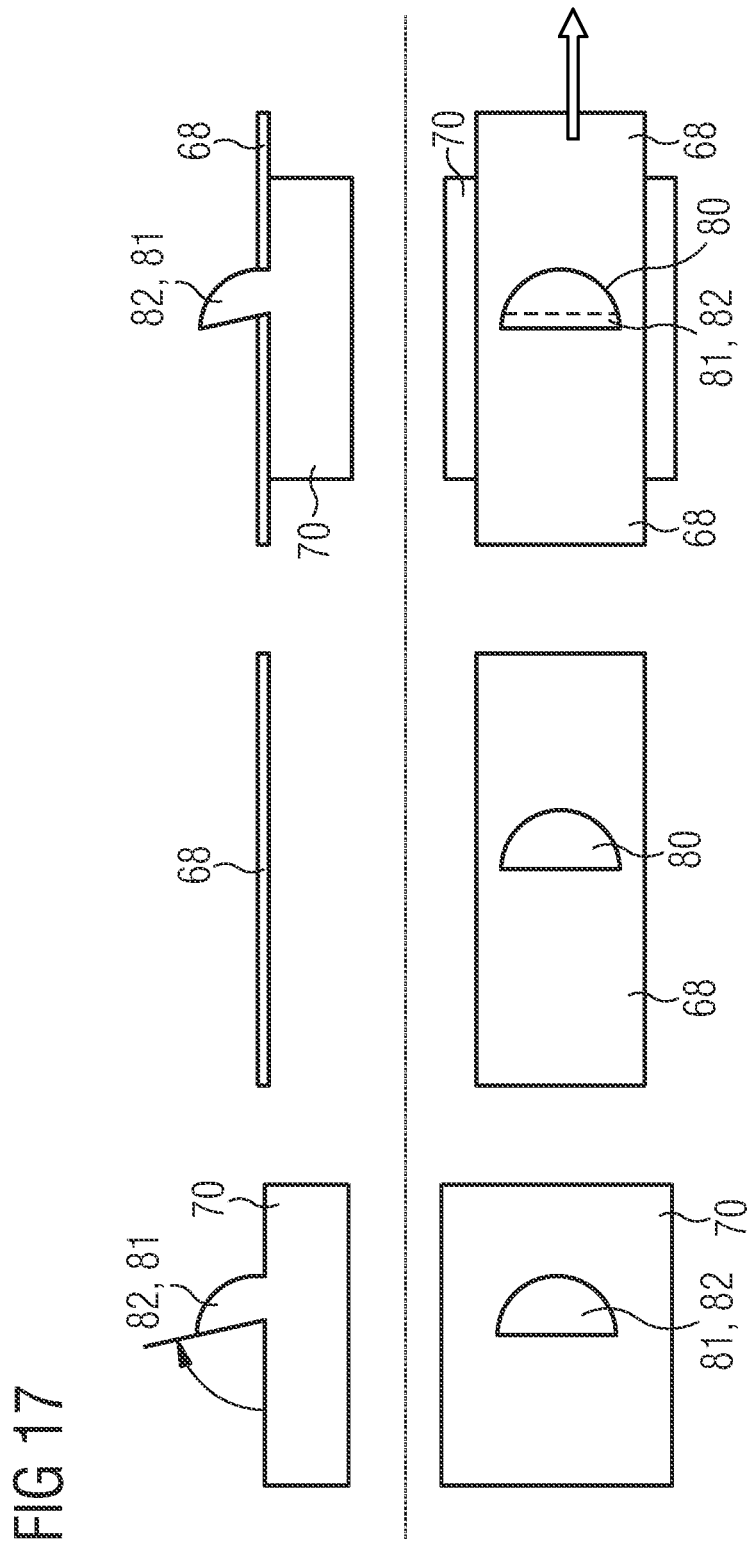

As illustrated in FIGS. 15 through 17, the holding eyes 80 and the fastening knobs 82 may have different shapes. FIG. 15, on the left, illustrates a hemispherical fastening knob 82, with which a circular holding eye 80 is associated (FIG. 15, in the center). FIG. 15, on the right, shows the positive connection which prevents the interconnector sheet 68 from sliding off the fuel cell region 70.

A further variant is illustrated on the left in FIG. 16, which shows a quarter-spherical fastening knob 82. This is associated with a D-shaped holding eye 80 (FIG. 16, in the center). By virtue of the steep flank of the fastening knob 82, slipping off can be prevented even better (FIG. 16, on the right). It is also possible to keep the interconnector sheet 68 slightly under mechanical stress and thus to enable even better application to the fuel cell region 70.

With the variant shown in FIG. 17, the positive fit can be further improved. As in FIG. 16, a D-shaped holding eye 80 is required. However, the fastening knob 82 is at an acute angle to the horizontal.

Figure 18:
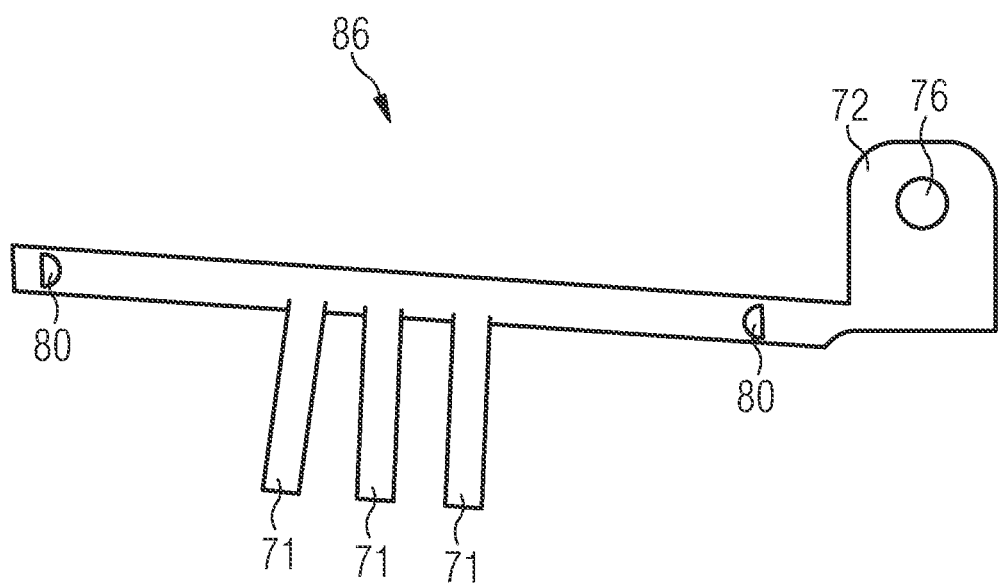
FIG. 18 and FIG. 19 show an example relating to the production of the interconnector sheet of FIG. 13.
Figure 19:
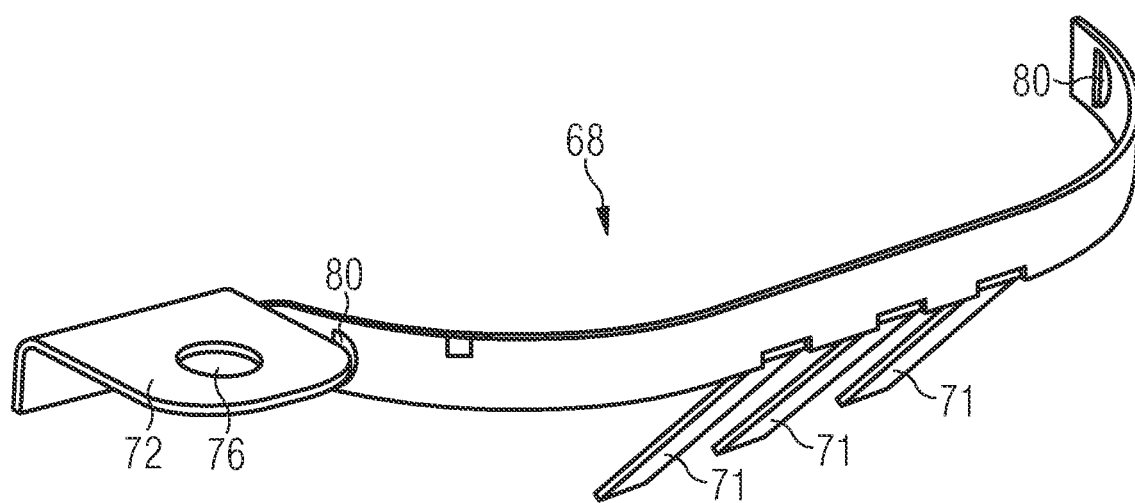

The production of an interconnector sheet 68 is explained in more detail below with reference to FIG. 18 and FIG. 19. An interconnector sheet blank 86 is cut out of a flat sheet metal material initially provided.

The interconnector sheet blank 86 already has a plurality of rectangular contact tongues 71, a connection region 72, a band-like region 78 as well as holding eyes 80.

The interconnector sheet blank 86 is formed into the finished interconnector sheet 68 by bending. In this case, the band-like region 78 is bent in such a way that the interconnector sheet 68 can conform to the fuel cell region 70. The holding eyes 80 are bent to positions corresponding to the fastening knobs 82. The contact tongues 71 receive the angle α, which corresponds to the slope of the gas channels 38, 40 with respect to the horizontal direction. Finally, the connection region 72 can also be bent into the horizontal.

Figure 20:
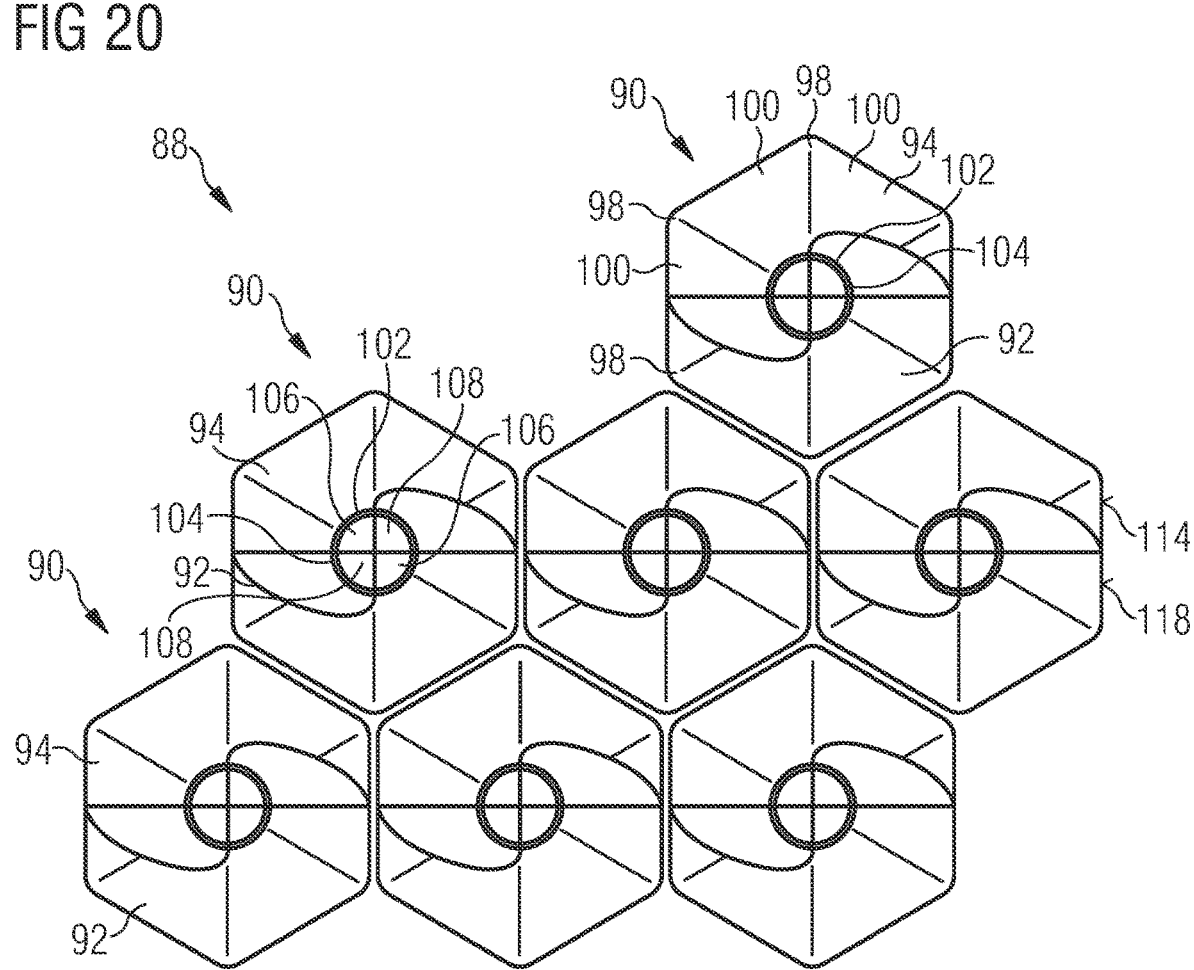
FIG. 20 and FIG. 21 show an example embodiment of a fuel cell system.
Figure 21:
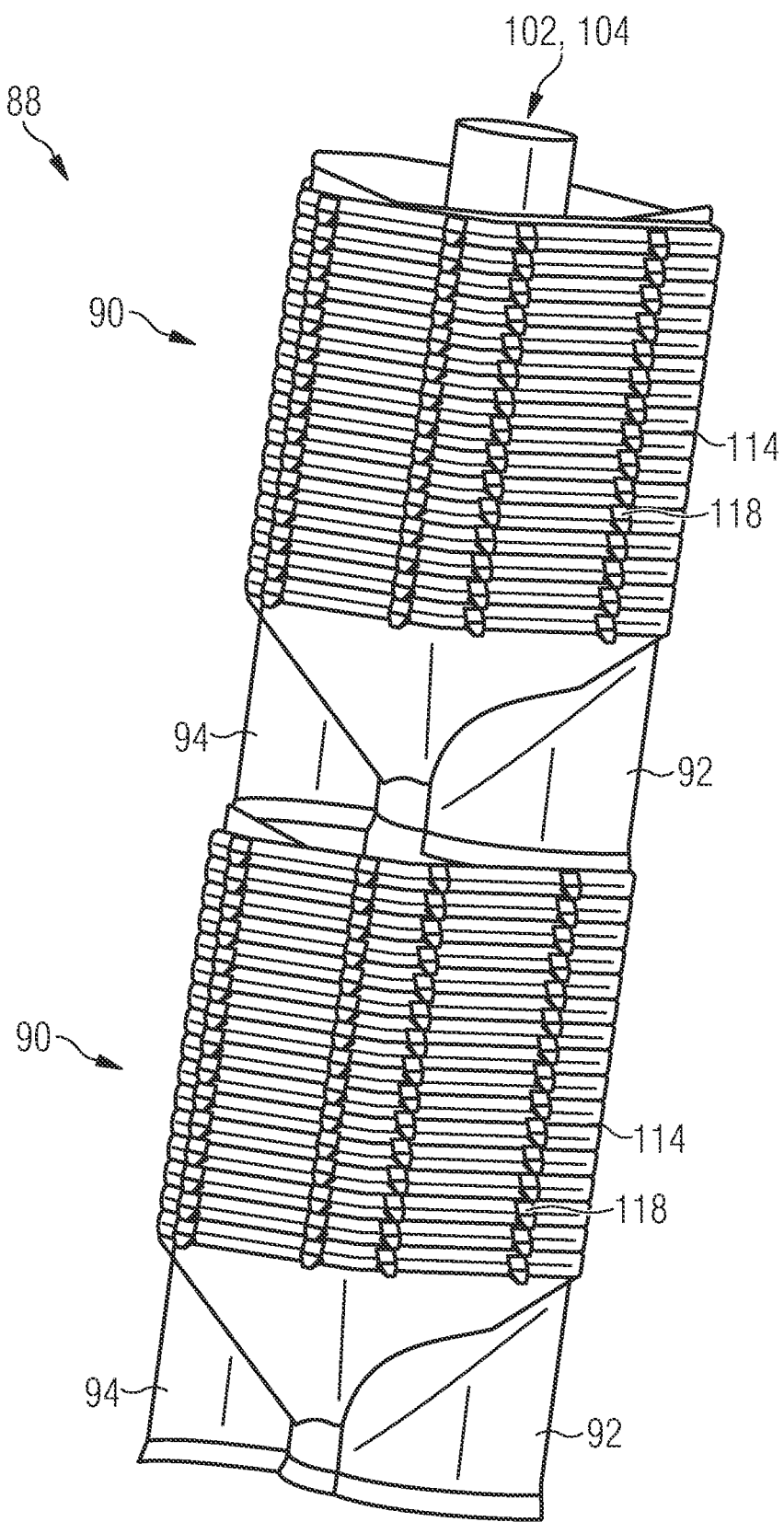

Reference is made below to FIG. 20 and FIG. 21, which each show an example of a fuel cell system 88. The fuel cell system 88 comprises a plurality of fuel cells 90, which is illustrated in more detail in FIG. 22 to FIG. 24.

The fuel cells 90 have a roughly hexagonal shape in plan view. The fuel cells 90 are arranged in a plane at a distance from each other, as shown in detail, for example, in FIG. 20. The fuel cells 90 may also be staggered along their construction axis 22, as shown in detail in FIG. 21. A combination of the arrangements in which the fuel cells 90 are arranged in a plurality of planes one above the other is also conceivable.

Figure 22:
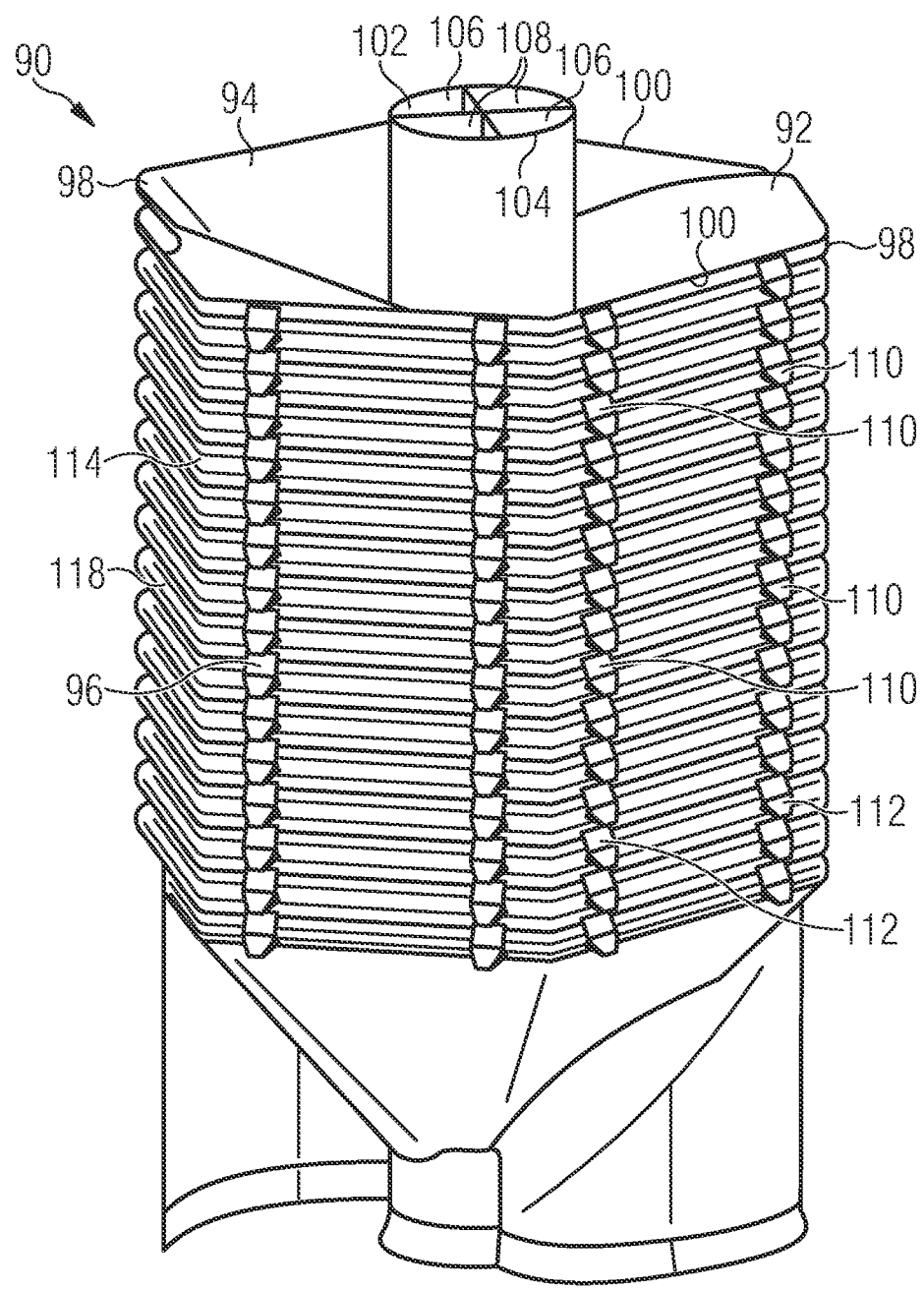
FIG. 22 shows an example embodiment of a fuel cell.
Figure 23:
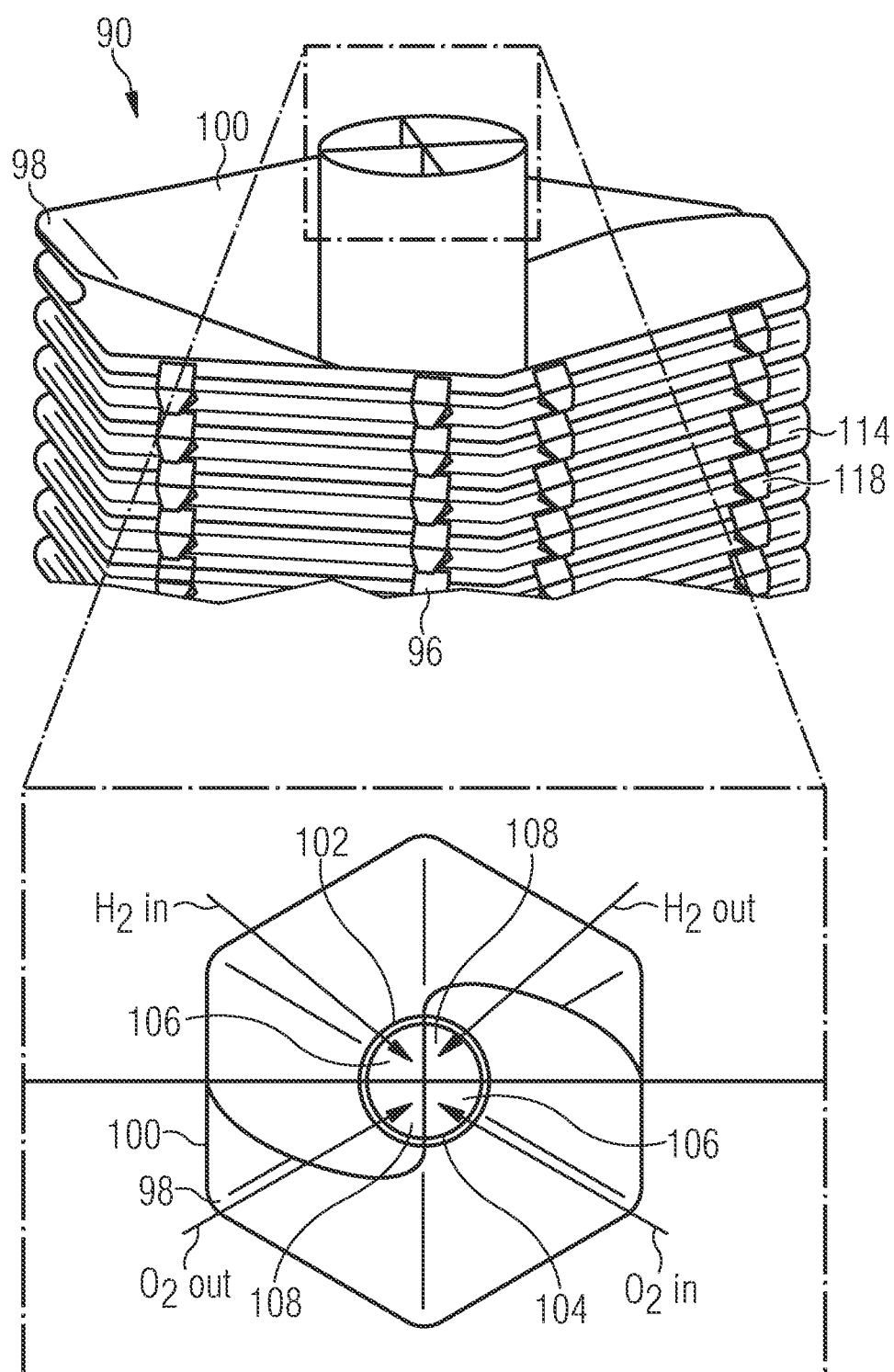
FIG. 23 shows a schematic illustration of the inflow and outflow of gas in the fuel cell of FIG. 22.
Figure 24:
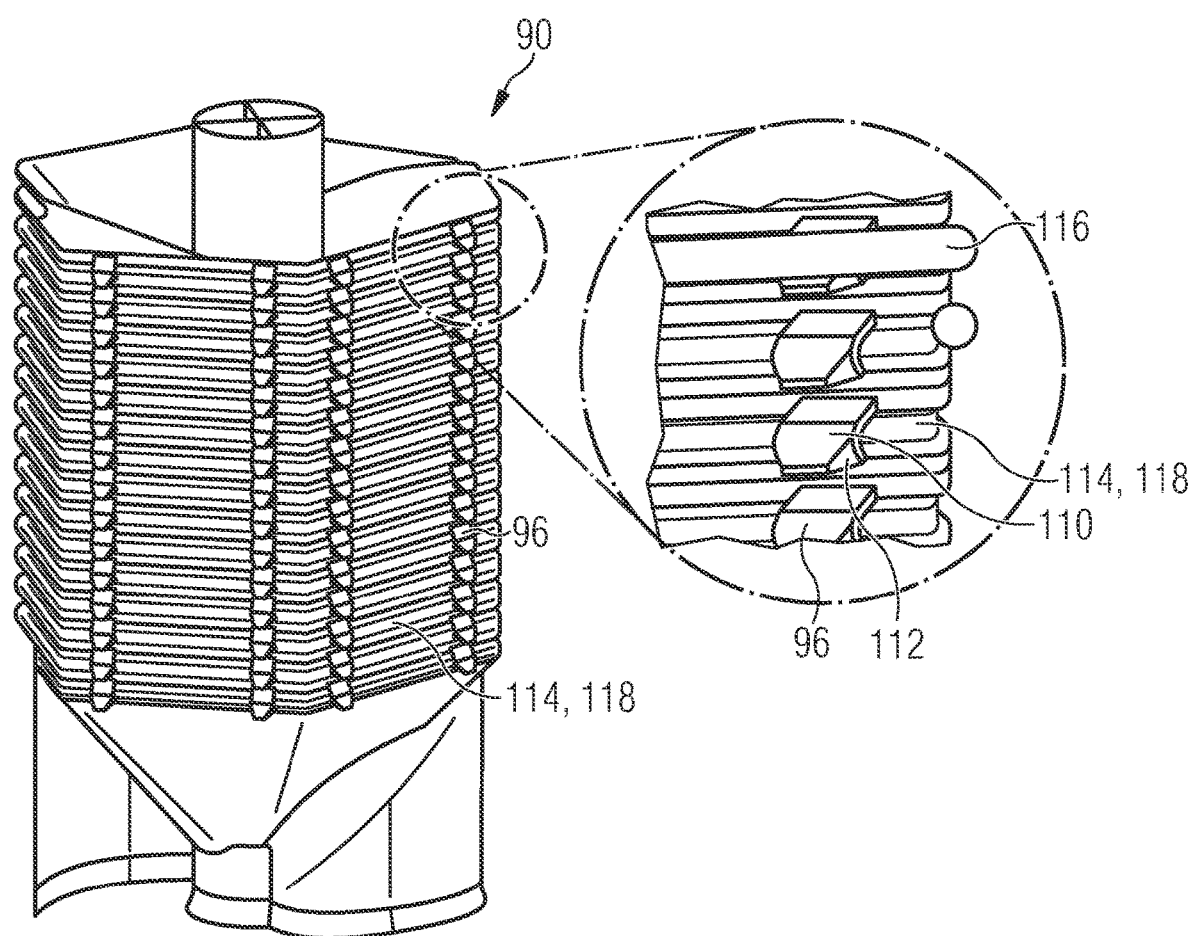
FIG. 24 shows a detail view of wiring of the fuel cell of FIG. 22.
Figure 25:
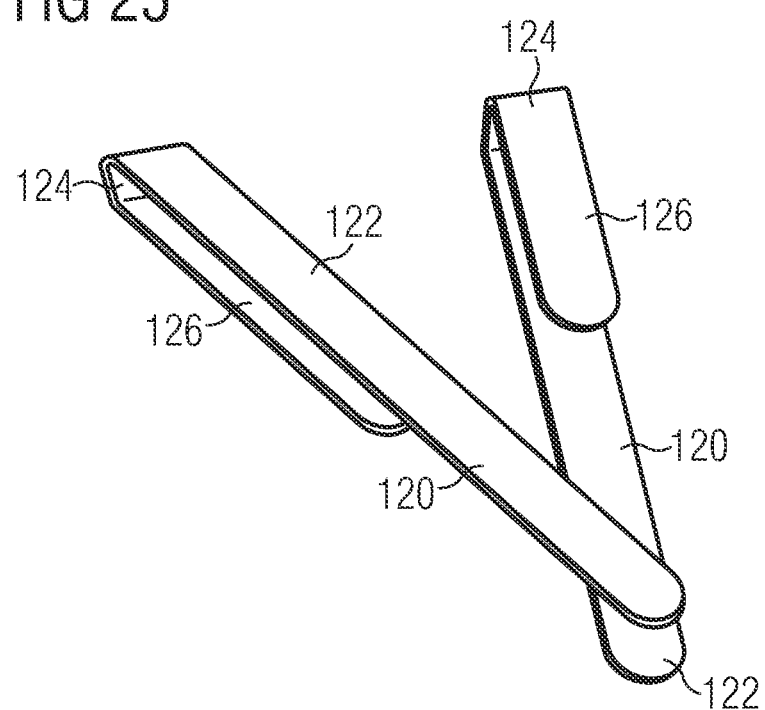
FIG. 25 shows an example embodiment of an interconnector sheet.

An example of the fuel cell 90 will be explained in detail below with reference to FIG. 22 through FIG. 24.

The fuel cell 90 has a first fuel cell region 92 and a second fuel cell region 94. Each fuel cell region 92, 94 contains a gas channel. In the present case, the first fuel cell region 92 and the second fuel cell region 94 are formed integrally as a single one-piece element.

The first fuel cell region 92 comprises a first gas channel, e.g. for an oxidizer, and the second fuel cell region 94 comprises a second gas channel, e.g. for fuel.

The first gas channel and the second gas channel extend in the form of a double helix in a circumferential direction about the construction axis 22. The construction axis 22 extends in the center of the fuel cell 90.

The first gas channel and the second gas channel are preferably connected to one another along their direction of extent by an ion-conductive separating layer. Furthermore, an insulation layer can be arranged in order to prevent a cell short circuit.

Each gas channel may include an electrode coating 96 to extract the electrical energy generated therein from the fuel cell 90.

Each of the gas channels has a plurality of gas channel curvature regions 98 and adjoining gas channel plane regions 100. Each gas channel curvature region 98 is preferably curved by 120°. Each gas channel plane region 100 is straight and without any curvature.

Overall, a substantially hexagonal shape of the fuel cell regions 92, 94 is obtained in plan view.

The fuel cell 90 comprises a first distribution tube 102 and a second distribution tube 104. The first distribution tube 102 can be provided for the fuel, while the second distribution tube 104 can be provided for the oxidizer.

The distribution tubes 102, 104 are arranged in a region which is surrounded or, as seen in plan view, enclosed by the gas channels. The distribution tubes 102, 104 are preferably arranged in the center of the fuel cell 90, as seen in plan view. In the present case, the distribution tubes 102, 104 extend parallel to the construction axis 22.

Each distribution tube 102, 104 has a gas supply region 106, which can be designed to be connectable to a gas reservoir. In the case of the oxidizer, the gas supply region 106 can serve for air supply without a gas reservoir.

In addition, each distribution tube 102, 104 has a gas discharge region 108, from which unused residual gas and reaction product can emerge.

For example, first distribution tube 102 may be provided for distribution of the fuel and form a continuous fluid path with the first gas channel. In other words, the gas supply region 106 of the first distribution tube 102 is fluidically connected to the gas discharge region 108 of the first distribution tube 102 via the first gas channel.

The second distribution tube 58 can be used to distribute the oxidizer and form a continuous fluid path with the second gas channel. In other words, the gas supply region 106 of the second distribution tube 104 is fluidically connected to the gas discharge region 108 of the second distribution tube 104 via the second gas channel.

The fuel cell 90 may be internally divided into a plurality of subsections which may be supplied with fuel and oxidizer through the distribution tubes 102, 104 independently of the other subsections.

The fuel cell 90 additionally comprises a plurality of apertures 110 for interconnector sheets. The apertures 110 are preferably arranged in the gas channel plane regions 100. The apertures 110 may be arranged at the respective ends of the gas channel plane region 100, adjacent to the gas channel curvature regions 98.

The fuel cell 90 comprises a holding device 112 for interconnector sheets. The holding device 112 is arranged in the vicinity of or in the apertures 110.

The fuel cell 90 also comprises a winding structure 114 for a conductive element 116, e.g. a wire. The winding structure 114 is on the outer circumferential surface of the fuel cell 90. The winding structure 114 is of spiral design. The winding structure 114 preferably comprises a groove 118 which extends in such a way that interconnector sheets of the same polarity can be electrically connected to one another by winding the conductive element 116 around the winding structure 114.

Furthermore, the conductive element 116 may have insulation that prevents the conductive element 116 from causing a short circuit. The conductive element 116 may also contain a plurality of wires, each of which is associated with one interconnector polarity and only comes into contact with the latter.

The fuel cell 90 furthermore comprises a plurality of interconnector sheets 120.

Each interconnector sheet 120 comprises a single contact tongue 122. The contact tongue 120 projects into the first gas channel or into the second gas channel. The contact tongues 120 are each fastened to the wall of the respective gas channel. The electrode coating 96 is preferably arranged in such a way that the contact tongues 120 are embedded in the electrode coating 96.

Each interconnector sheet 120 further comprises an electrical connection region 124, which adjoins the contact tongue 120. The connection region 124 is designed in such a way that it faces radially outward in the installed state of the interconnector sheet 120 and can be engaged by a conductive element 116.

Each interconnector sheet 120 has a clamping region 126. The clamping region 126 extends substantially parallel to and at a distance from the contact tongue 120. The interconnector sheet 120 can therefore be inserted into the aperture 110 and held on the fuel cell 90.

Figure 26:
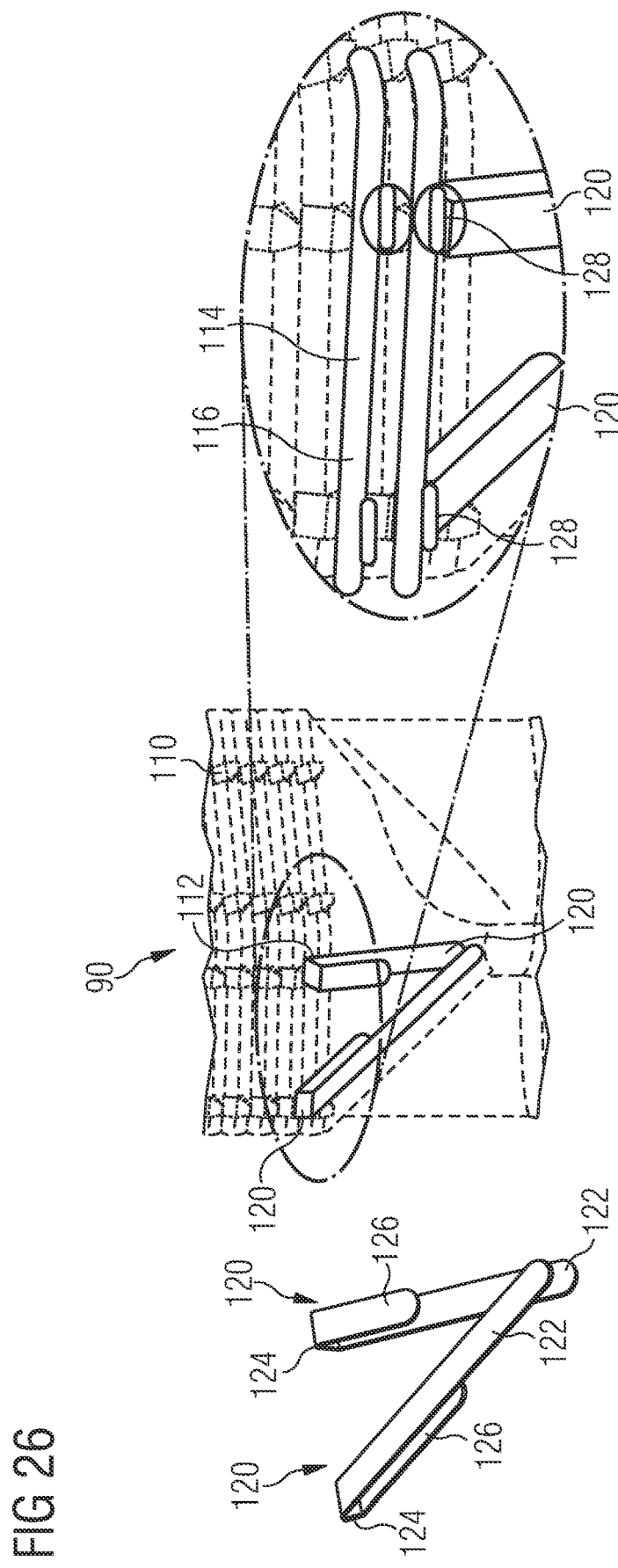
FIG. 26 shows an example of a wiring operation of the fuel cell.

In the following, reference is made to FIG. 26. As illustrated, the fuel cell 90 may be electrically connected by first inserting the interconnector sheets 120 into the apertures 110. The conductive element 116 can then be wound around the outer circumferential surface of the fuel cell 90 using the winding structure 114. In this case, the conductive element 116 comes into contact with the interconnector sheets 120, to be more precise the electrical connection region 124. Any remaining openings can be sealed by glass solder. At the same time, the glass solder can be used for fastening the interconnector sheets 120.

In order to provide a higher power density, a fuel cell (66) is proposed. The fuel cell (66) can be produced by 3D printing in ceramic and has an improved power density by virtue of its spiral shape. In order to better extract the energy generated by the fuel cell (66), an interconnector sheet (68) is proposed which can be fastened positively to fastening knobs (82) of the fuel cell (66) by holding eyes (80). In addition, the interconnector sheet (68) can be fixed by glass solder.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 fuel cell
12 first fuel cell region
14 second fuel cell region
16 gas channel
18 first gas channel
20 second gas channel
22 construction axis
24 ion-conductive separating layer
26 insulation layer
28 electrode coating
30 fuel cell
32 fuel cell region
34 first fuel cell region
36 second fuel cell region
38 first gas channel
40 second gas channel
42 construction axis
44 gas channel curvature region
46 gas channel plane region
48 gas inlet region
50 gas outlet region
52 electrode coating
54 fuel cell
56 first distribution tube
58 second distribution tube
60 gas supply region
62 gas discharge region
64 subsection
66 fuel cell
68 interconnector sheet
70 fuel cell region
71 contact tongue
72 connection region
74 connection axis
76 connection opening
78 band-like region
80 holding eye
81 holding device
82 fastening knobs
84 aperture
86 interconnector sheet blank
88 fuel cell system
90 fuel cell
92 first fuel cell region
94 second fuel cell region
96 electrode coating
98 gas channel curvature region
100 gas channel plane region
102 first distribution tube
104 second distribution tube
106 gas supply region
108 gas discharge region
110 aperture
112 holding device
114 winding structure
116 conductive element
118 groove
120 interconnector sheet
122 contact tongue
124 electrical connection region
126 clamping region

The invention claimed is:

1. A fuel cell for a fuel cell system, the fuel cell comprising:
a first fuel cell region that forms a first gas channel for a flow of a fuel through the first gas channel;
a second fuel cell region that forms a second gas channel for a flow of an oxidizer through the second gas channel;
a first distribution tube comprising:
a gas supply region for providing the fuel to the first gas channel of the first fuel cell region; and
a gas discharge region for discharging, from the first gas channel of the first fuel cell region, reaction product and/or any of the fuel that is unconsumed; and
a second distribution tube comprising:
a gas supply region for providing the oxidizer to the second gas channel of the second fuel cell region; and
a gas discharge region for discharging, from the second gas channel of the second fuel cell region, reaction product and/or any of the oxidizer that is unconsumed; and
wherein the first and second gas channels that are formed, respectively, by the first and second fuel cell regions both extend in a circumferential direction around a construction axis;
wherein, when viewed along the construction axis, the first and second distribution tubes are both at least partially surrounded by both of the first and second gas channels of the first and second fuel cell regions, respectively;
wherein the first gas channel comprises a gas inlet region and a gas outlet region, the gas inlet region and the gas outlet region of the first gas channel being arranged such that, when a further first fuel cell region is arranged or formed offset from the first fuel cell region along the construction axis, the gas outlet region of the first gas channel is aligned with and/or fluidically connected to a gas inlet region of a further first gas channel of the further first fuel cell region, the further first gas channel being configured for receiving the flow of the fuel from the first gas channel;
wherein the second gas channel comprises a gas inlet region and a gas outlet region, the gas inlet region and the gas outlet region of the second gas channel being arranged such that, when a further second fuel cell region is arranged or formed offset from the second fuel cell region along the construction axis, the gas outlet region of the second gas channel is aligned with and/or fluidically connected to a gas inlet region of a further second gas channel of the further second fuel cell region, the further second gas channel being configured for receiving the flow of the oxidizer from the second gas channel;

wherein the fuel cell is divided into subsections that each contain a respective portion of each of the first and second gas channels of the first and second fuel cell regions, the first and second distribution tubes being connected for providing, within each of the subsections and in parallel, the respective portion of each of the first and second gas channels contained therein with the fuel and the oxidizer, respectively.

2. The fuel cell of claim 1, wherein the first gas channel and the second gas channel extend in a circumferential direction about the construction axis in a form of a double helix.

3. The fuel cell of claim 1, wherein the first and second fuel cell regions comprise a plurality of the first fuel cell regions and a plurality of the second fuel cell regions, the plurality of the first fuel cell regions and the plurality of the second fuel cell regions being arranged along the construction axis such that the first gas channels and the second gas channels are in each case fluidically connected.

4. The fuel cell of claim 1, wherein an ion-conductive separating layer is on one of the first and second gas channels or between adjacent gas channels of the first and second gas channels to connect the adjacent gas channels to one another in an ion-conducting manner.

5. The fuel cell of claim 1, wherein the first and second gas channels, when viewed in a direction of extent thereof, enclose an angle between 30° and 60°, with a plane orthogonal to the construction axis.

6. The fuel cell of claim 1, wherein the first and second gas channels form a double helix.

7. The fuel cell of claim 1, wherein each of the first and second gas channels has a gas channel curvature region and an adjoining gas channel plane region, wherein the gas inlet regions and/or the gas outlet regions are arranged on the gas channel plane region in a middle of the gas channel plane region.

8. The fuel cell of claim 7, wherein each distribution tube is arranged within a region surrounded by the gas channel curvature region and the gas channel plane region of the first and second gas channels.

9. The fuel cell of claim 1, wherein each of the first and second gas channels contains a conductive electrode coating for extracting generated electrical energy from the fuel cell.

10. The fuel cell of claim 9, comprising interconnector sheets, wherein each interconnector sheet is arranged on one of the first and second fuel cell regions and is embedded in a respective electrode coating for extracting the generated electrical energy from a corresponding one of the first and second fuel cell regions.

11. The fuel cell of claim 1, where the fuel cell is a solid oxide fuel cell of an aircraft.

12. A fuel cell system for an aircraft, comprising:
a plurality of fuel cells of claim 1;
wherein the plurality of fuel cells are arranged in one plane and/or stacked at a distance from each other along the construction axis.

13. An aircraft comprising a fuel cell of claim 1.

* * * * *